United States Patent
Liu et al.

(10) Patent No.: US 12,112,257 B2
(45) Date of Patent: Oct. 8, 2024

(54) DATA PROCESSING METHOD, DEVICE, COMPUTER EQUIPMENT AND STORAGE MEDIUM

(71) Applicant: ANHUI CAMBRICON INFORMATION TECHNOLOGY CO., LTD., Anhui (CN)

(72) Inventors: Shaoli Liu, Anhui (CN); Shiyi Zhou, Anhui (CN); Xishan Zhang, Anhui (CN); Hongbo Zeng, Anhui (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 954 days.

(21) Appl. No.: 17/137,981

(22) Filed: Dec. 30, 2020

(65) Prior Publication Data

US 2021/0117768 A1  Apr. 22, 2021

Related U.S. Application Data

(63) Continuation-in-part of application No. PCT/CN2020/110306, filed on Aug. 20, 2020.

(30) Foreign Application Priority Data

Aug. 27, 2019 (CN) .......................... 201910797127.3
Sep. 19, 2019 (CN) .......................... 201910888449.9

(51) Int. Cl.
*G06N 3/08* (2023.01)
*G06N 3/063* (2023.01)

(52) U.S. Cl.
CPC .............. *G06N 3/063* (2013.01); *G06N 3/08* (2013.01)

(58) Field of Classification Search
CPC .......... G06N 3/08; G06N 3/063; G06N 3/045; G06N 3/0495; G06F 7/523
See application file for complete search history.

(56) References Cited

U.S. PATENT DOCUMENTS

| 5,052,043 A | 9/1991 | Gaborski |
| 6,704,757 B1 | 3/2004 | Ohmi et al. |

(Continued)

FOREIGN PATENT DOCUMENTS

| CN | 1503858 A | 6/2004 |
| CN | 1503958 A | 6/2004 |

(Continued)

OTHER PUBLICATIONS

Zhen Dong; Hessian Aware Quantization of Neural Networks With Mixed Precision; University of California, Berkeley; Apr. 29, 2019; pp. 12.

(Continued)

*Primary Examiner* — Dave Misir
(74) *Attorney, Agent, or Firm* — Rimon PC

(57) ABSTRACT

The present disclosure provides a data processing method, a data processing device, a computer equipment, and a storage medium. The data processing device includes a board card and the board card provided in the present disclosure includes a storage component, an interface device, a control component, and an artificial intelligence chip of a data processing device. According to the data processing method, the data processing device, the computer equipment, and the storage medium provided in the embodiments of the present disclosure, data to be quantized is quantized according to a corresponding quantization parameter, which may reduce the storage space of data while ensuring the precision, as well as ensure the accuracy and reliability of the operation result and improve the operation efficiency.

16 Claims, 3 Drawing Sheets

(56) References Cited

U.S. PATENT DOCUMENTS

| | | |
|---|---|---|
| 6,715,065 B1 | 3/2004 | Ebata et al. |
| 6,931,639 B1 | 8/2005 | Eickemeyer |
| 7,242,414 B1 | 7/2007 | Thekkath et al. |
| 7,406,451 B2 | 7/2008 | Mrziglod et al. |
| 7,721,128 B2 | 5/2010 | Johns et al. |
| 7,945,607 B2 | 5/2011 | Hinds |
| 8,694,572 B2 | 4/2014 | Samy et al. |
| 8,924,455 B1 | 12/2014 | Barman et al. |
| 9,412,366 B2 | 8/2016 | Wilensky et al. |
| 9,916,531 B1* | 3/2018 | Zivkovic ............ G06N 3/063 |
| 10,187,568 B1 | 1/2019 | Tran et al. |
| 10,224,954 B1 | 3/2019 | Madduri et al. |
| 10,360,304 B1 | 7/2019 | Alvarez et al. |
| 10,427,306 B1 | 10/2019 | Quinlan et al. |
| 11,630,982 B1* | 4/2023 | Hsu ............. G06N 3/0495 706/22 |
| 2002/0138714 A1 | 9/2002 | Leibholz et al. |
| 2003/0167460 A1 | 9/2003 | Desai et al. |
| 2005/0138327 A1 | 6/2005 | Tabei |
| 2006/0161375 A1 | 7/2006 | Duberstein et al. |
| 2009/0113186 A1 | 4/2009 | Kato et al. |
| 2009/0125293 A1 | 5/2009 | Lefurgy et al. |
| 2010/0073068 A1 | 3/2010 | Cho et al. |
| 2011/0060587 A1 | 3/2011 | Phillips et al. |
| 2011/0301777 A1 | 12/2011 | Cox et al. |
| 2012/0316845 A1 | 12/2012 | Grey et al. |
| 2013/0054110 A1 | 2/2013 | Sata |
| 2013/0332610 A1 | 12/2013 | Beveridge |
| 2014/0081625 A1 | 3/2014 | Wilensky et al. |
| 2014/0164737 A1 | 6/2014 | Collange et al. |
| 2014/0249814 A1 | 9/2014 | Nakano et al. |
| 2015/0134581 A1 | 5/2015 | Doeding et al. |
| 2015/0370303 A1 | 12/2015 | Krishnaswamy et al. |
| 2016/0026231 A1 | 1/2016 | Ignowski et al. |
| 2016/0054922 A1 | 2/2016 | Awasthi et al. |
| 2016/0124710 A1 | 5/2016 | Lutz et al. |
| 2016/0170866 A1 | 6/2016 | Ioualalen et al. |
| 2016/0328645 A1 | 11/2016 | Lin et al. |
| 2016/0328647 A1 | 11/2016 | Lin et al. |
| 2017/0090956 A1 | 3/2017 | Linsky |
| 2017/0103022 A1 | 4/2017 | Kreinin et al. |
| 2017/0142327 A1 | 5/2017 | Bayani |
| 2017/0161604 A1 | 6/2017 | Craddock et al. |
| 2017/0221176 A1 | 8/2017 | Munteanu et al. |
| 2017/0257079 A1 | 9/2017 | Jain et al. |
| 2017/0262959 A1 | 9/2017 | Lee et al. |
| 2017/0316307 A1 | 11/2017 | Koster et al. |
| 2017/0316312 A1 | 11/2017 | Goyal et al. |
| 2017/0344882 A1 | 11/2017 | Ambrose et al. |
| 2017/0353163 A1 | 12/2017 | Gazneli et al. |
| 2017/0357530 A1 | 12/2017 | Shih et al. |
| 2017/0357910 A1 | 12/2017 | Sommer et al. |
| 2018/0046903 A1 | 2/2018 | Yao et al. |
| 2018/0088996 A1 | 3/2018 | Rossi et al. |
| 2018/0096243 A1 | 4/2018 | Patil et al. |
| 2018/0157464 A1 | 6/2018 | Lutz et al. |
| 2018/0288440 A1 | 10/2018 | Chao |
| 2018/0293517 A1 | 10/2018 | Browne et al. |
| 2018/0300931 A1 | 10/2018 | Vembu et al. |
| 2018/0322391 A1 | 11/2018 | Wu et al. |
| 2018/0350109 A1* | 12/2018 | Pan ................. G06T 9/002 |
| 2018/0357541 A1 | 12/2018 | Chen et al. |
| 2018/0367729 A1 | 12/2018 | Parasnis et al. |
| 2018/0373976 A1 | 12/2018 | Woo |
| 2019/0042925 A1 | 2/2019 | Choe et al. |
| 2019/0050710 A1* | 2/2019 | Wang ................. G06N 3/063 |
| 2019/0057696 A1 | 2/2019 | Ogawa |
| 2019/0114142 A1 | 4/2019 | Yoda et al. |
| 2019/0122094 A1 | 4/2019 | Chen et al. |
| 2019/0122119 A1 | 4/2019 | Husain |
| 2019/0138372 A1 | 5/2019 | Tee |
| 2019/0147322 A1 | 5/2019 | Kim et al. |
| 2019/0164285 A1 | 5/2019 | Nye et al. |
| 2019/0180170 A1 | 6/2019 | Huang et al. |
| 2019/0199370 A1 | 6/2019 | Madduri et al. |
| 2019/0220734 A1 | 7/2019 | Ferdman et al. |
| 2019/0228762 A1 | 7/2019 | Wang et al. |
| 2019/0251429 A1 | 8/2019 | Du et al. |
| 2019/0265949 A1 | 8/2019 | Ito |
| 2019/0278677 A1 | 9/2019 | Terechko et al. |
| 2019/0294968 A1 | 9/2019 | Vantrease et al. |
| 2019/0339937 A1 | 11/2019 | Lo et al. |
| 2019/0340492 A1* | 11/2019 | Burger ............ G06N 3/08 |
| 2019/0347550 A1* | 11/2019 | Jung ............... G06N 3/08 |
| 2019/0385050 A1* | 12/2019 | Wang .............. G06N 3/08 |
| 2020/0005424 A1 | 1/2020 | Appu et al. |
| 2020/0097799 A1 | 3/2020 | Divakar et al. |
| 2020/0117453 A1 | 4/2020 | Zhang et al. |
| 2020/0117614 A1 | 4/2020 | Zhang et al. |
| 2020/0125508 A1 | 4/2020 | Liu et al. |
| 2020/0126554 A1 | 4/2020 | Chen et al. |
| 2020/0126555 A1 | 4/2020 | Chen et al. |
| 2020/0142748 A1 | 5/2020 | Liu et al. |
| 2020/0159527 A1 | 5/2020 | Zhang et al. |
| 2020/0159530 A1 | 5/2020 | Zhang et al. |
| 2020/0159532 A1 | 5/2020 | Zhang et al. |
| 2020/0159533 A1 | 5/2020 | Zhang et al. |
| 2020/0160162 A1 | 5/2020 | Zhang et al. |
| 2020/0160163 A1 | 5/2020 | Liu et al. |
| 2020/0160219 A1 | 5/2020 | Zhang et al. |
| 2020/0160220 A1 | 5/2020 | Zhang et al. |
| 2020/0160221 A1 | 5/2020 | Zhang et al. |
| 2020/0160222 A1 | 5/2020 | Zhang et al. |
| 2020/0168227 A1 | 5/2020 | Chen et al. |
| 2020/0174547 A1 | 6/2020 | Fang et al. |
| 2020/0183752 A1 | 6/2020 | Liu et al. |
| 2020/0241874 A1 | 7/2020 | Chen et al. |
| 2020/0257972 A1 | 8/2020 | Miniskar et al. |
| 2020/0320385 A1* | 10/2020 | Yang ............... G06N 3/08 |
| 2020/0334041 A1 | 10/2020 | Zhang et al. |
| 2020/0334522 A1 | 10/2020 | Zhang et al. |
| 2020/0334572 A1 | 10/2020 | Zhang et al. |
| 2020/0394522 A1 | 12/2020 | Liu et al. |
| 2020/0394523 A1 | 12/2020 | Liu et al. |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0264270 A1 | 8/2021 | Liu et al. |
| 2021/0286688 A1 | 9/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |
| 2021/0374510 A1 | 12/2021 | Liu et al. |
| 2021/0374511 A1 | 12/2021 | Liu et al. |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102789413 A | 11/2012 |
| CN | 102903089 A | 1/2013 |
| CN | 104914977 A | 9/2015 |
| CN | 105389158 A | 3/2016 |
| CN | 107665364 A | 7/2016 |
| CN | 103534664 A | 8/2016 |
| CN | 105893419 A | 8/2016 |
| CN | 106156310 A | 11/2016 |
| CN | 106354568 A | 1/2017 |
| CN | 106406812 A | 2/2017 |
| CN | 106469291 A | 3/2017 |
| CN | 106650922 A | 5/2017 |
| CN | 106814639 A | 6/2017 |
| CN | 107197297 A | 6/2017 |
| CN | 106951587 A | 7/2017 |
| CN | 106951962 A | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107644254 A | 1/2018 |

(56) References Cited

FOREIGN PATENT DOCUMENTS

| | | |
|---|---|---|
| CN | 107797913 A | 3/2018 |
| CN | 104899641 A | 7/2018 |
| CN | 108337000 A | 7/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 110008952 A | 3/2019 |
| CN | 109800877 A | 5/2019 |
| CN | 109902745 A | 6/2019 |
| CN | 110020616 A | 7/2019 |
| CN | 109993296 A | 9/2019 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| JP | H03075860 A | 8/1989 |
| JP | H09-265379 A | 10/1997 |
| JP | 2009134433 A | 8/2012 |
| JP | 2013514570 A | 4/2013 |
| JP | 2015509183 A | 3/2015 |
| JP | 1996087475 B2 | 5/2015 |
| JP | 2015176158 A | 10/2015 |
| JP | 2014199464 A | 10/2017 |
| JP | 201810618 A | 1/2018 |
| JP | 201826114 A | 2/2018 |
| JP | 2018514872 A | 6/2018 |
| JP | 2019519852 A | 7/2019 |
| KR | 20100087845 A | 1/2009 |
| WO | 2008153194 A1 | 12/2008 |
| WO | 2016182659 A1 | 11/2016 |
| WO | 2016186823 A1 | 11/2016 |
| WO | 2018/103736 A1 | 6/2018 |
| WO | 2018140294 A1 | 8/2018 |

OTHER PUBLICATIONS

Li et al., "Using Artificial Neural Network for Predicting Thread Partitioning in Speculative Multithreading", IEEE, 2015, pp. 823-826.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Extended European Search Report for Application No. 19215861.6 mailed May 15, 2020.

Extended European Search Report for Application No. 19215862.4 mailed May 15, 2020.

Sumina Yamashita, et al., "A Method to create illustrate images using Dcgan," JISJ SIG Technical Report, vol. 2017-MPS-112 No. 16, Feb. 27, 2017; translation of abstract included.

Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Yi Yang et al., "Deploy Large-Scale Deep Neural Networks in Resource Constrained Io T Devices with Local Quantization Region", Arxiv.org, Cornell University Library, 201 Olin Library Cornell University Ithaca, NY 14853, May 24, 2018 (May 24, 2018), XP081234517.

European Patent Office, Extended European Search Report for European Application No. 19218382.0 dated Apr. 24, 2020.

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].

Song Mingcong et al., "In-Situ AI: Towards Autonomous and Incremental Deep Leaming for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

European Patent Office, extended European search report for Application No. 19216754.2 mailed May 8, 2020.

Extended European Search Report for EP Application No. 19214324.6 mailed Oct. 1, 2020.

* cited by examiner

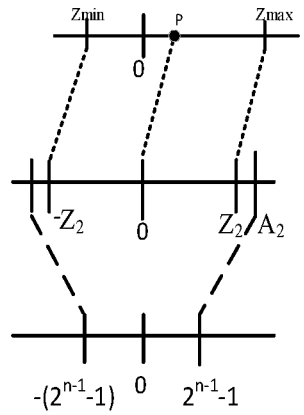

FIG. 3

| Determining, by the control module, a plurality pieces of data to be quantized from target data of the neural network, and obtaining a quantization result of the target data according to a piece of quantized data corresponding to each piece of data to be quantized, where the piece of quantized data corresponding to each piece of data to be quantized is obtained by quantizing the piece of data to be quantized by using a corresponding quantization parameter, and the quantization parameter includes a point location | ⟵ S11 |
|---|---|

| Performing, by the first operation sub-module, an operation related to the quantization result to obtain the operation result | ⟵ S12 |
|---|---|

FIG. 4

DATA PROCESSING METHOD, DEVICE, COMPUTER EQUIPMENT AND STORAGE MEDIUM

CROSS-REFERENCE TO RELATED APPLICATIONS

This application is a continuation-in-part of International Application No. PCT/CN2020/110306, filed Aug. 20, 2020, which claims priority to Chinese Patent Application No. 201910797127.3 filed on Aug. 27, 2019 with the title of "Data Processing Method, Device, Computer Equipment and Storage Medium" and Chinese Patent Application No. 201910888449.9 filed on Sep. 19, 2020 with the title of "Data Processing Method, Device, Computer Equipment and Storage Medium".

The content of the aforementioned applications are herein incorporated by reference in their entireties.

TECHNICAL FIELD

The present disclosure relates to the technical field of computer technology, and specifically to a neural network quantization method, a device, a computer equipment and a storage medium.

BACKGROUND

A neural network (NN) is a mathematical model or computation model that imitates the structure and function of the biological neural network. Through training with sample data, the neural network continuously corrects the network weights and the thresholds so that the error function drops in the direction of negative gradient to approach the expected output. It is a widely used recognition and classification model, which is mostly used for function approximation, model recognition and classification, data compression and time series prediction, etc. The neural network has been applied to image recognition, speech recognition, natural language processing and other fields. However, as the complexity of the neural network increases, the amount of data and data dimensions constantly increases too, which poses greater challenges to data processing efficiency, storage capacity and access efficiency of operation devices. In related arts, quantization of the operation data in the neural network is based on a fixed bit width, in other words, the operation data of floating point type is converted to the operation data of fixed point type to realize the compression of the operation data in the neural network. However, in related arts, a same quantization scheme is adopted for the entire neural network. Since there may be great differences between different operation data in the neural network, adopting the same quantization scheme may lead to low precision and affect the result of data operation.

SUMMARY

Based on the situation above, in order to solve the technical problems, the present disclosure provides a data processing method, a device, a computer equipment, and a storage medium.

A first aspect of the present disclosure provides a neural network quantization method including a control module and a processing module. The processing module includes a first operation sub-module. The first operation sub-module includes a main operation sub-module and a secondary operation sub-module.

The control module is configured to determine a plurality pieces of data to be quantized from target data of the neural network, and obtain a quantization result of the target data according to a piece of quantized data corresponding to each piece of data to be quantized. The piece of quantized data corresponding to each piece of data to be quantized is obtained by quantizing the piece of data to be quantized by using a corresponding quantization parameter. The quantization parameter includes a point location.

The first operation sub-module is configured to perform an operation related to the quantization result to obtain an operation result, wherein The main operation sub-module is configured to send first data to the secondary operation sub-module, where the first data includes first-style data, which is in the quantization result, obtained by quantizing according to the point location.

The secondary operation sub-module is configured to perform multiplication on the received first data to obtain an intermediate result.

The main operation sub-module is also configured to perform an operation on data except for the first data in the intermediate result and the quantization result to obtain an operation result.

A second aspect of the present disclosure provides a neural network quantization method applied to a neural network quantization device. The neural network quantization device includes a control module and a processing module. The processing module includes a first operation sub-module. The first operation sub-module includes a main operation sub-module and a secondary operation sub-module. The neural network quantization method includes: determining, by the control module, a plurality pieces of data to be quantized from target data of the neural network, and obtaining a quantization result of the target data according to a piece of quantized data corresponding to each piece of data to be quantized, where the piece of quantized data corresponding to each piece of data to be quantized is obtained by quantizing the piece of data to be quantized by using a corresponding quantization parameter, and the quantization parameter includes a point location; and performing, by the first operation sub-module, an operation related to the quantization result to obtain an operation result.

Performing, by the first operation sub-module, an operation related to the quantization result to obtain the operation result includes:
  sending, by the main operation sub-module, first data to the secondary operation sub-module, where the first data includes first-style data, which is in the quantization result, obtained by quantizing according to the point location;
  performing, by the secondary operation sub-module, multiplication on the received first data to obtain an intermediate result; and
  performing, by the main operation sub-module, an operation on data except for the first data in the intermediate result and the quantization result to obtain the operation result.

A third aspect of the present disclosure provides an artificial intelligence chip including the above-mentioned neural network quantization device.

A fourth aspect of the present disclosure provides an electronic equipment including the above-mentioned artificial intelligence chip.

A fifth aspect of the present disclosure provides a board card including a storage component, an interface device, a control component, and the artificial intelligence chip.

The artificial intelligence chip is connected to the storage component, the control component, and the interface device, respectively.

The storage component is configured to store data.

The interface device is configured to implement data transfer between the artificial intelligence chip and an external equipment.

The control component is configured to monitor a state of the artificial intelligence chip.

A sixth aspect of the present disclosure provides a non-transitory computer readable storage medium that stores a computer program instruction. When the computer program instruction is executed by a processor, the neural network quantization method is realized.

Embodiments of the present disclosure provide a neural network quantization method, a neural network quantization device, a computer equipment, and a storage medium. The device includes a control module and a processing module. The processing module includes a first operation sub-module. The first operation sub-module includes a main operation sub-module and a secondary operation sub-module. The control module is configured to determine a plurality pieces of data to be quantized from target data of the neural network, and obtain a quantization result according to quantized data corresponding to each piece of data to be quantized. The quantized data corresponding to each piece of data to be quantized is obtained by quantizing the piece of data to be quantized by using a corresponding quantization parameter. The quantization parameter includes a point location. The first operation sub-module is configured to perform an operation related to the quantization result to obtain an operation result. The main operation sub-module is configured to send first data to the secondary operation sub-module, where the first data includes first-style data, which is in the quantization result, obtained by quantizing according to the point location. The secondary operation sub-module is configured to perform multiplication on the received first data to obtain an intermediate result. The main operation sub-module is configured to perform an operation on data except for the first data in the intermediate result and the quantization result to obtain an operation result. According to the neural network quantization method, the neural network quantization device, the computer equipment, and the storage medium provided in the embodiments of the present disclosure, a plurality of pieces of data to be quantized in the target data may be separately quantized according to the corresponding quantization parameter, and the operation related to the quantization result is performed by the first operation sub-module, which may reduce the storage space of data while ensuring the precision, ensure the accuracy and reliability of the operation result, and improve the operation efficiency. In addition, performing quantization may also reduce the size of the neural network model and reduce the performance requirements of a terminal running the neural network model.

Through the derivation of the technical features in the claims, the technical effect of the technical problems in the background may be achieved. According to the following detailed description of exemplary embodiments with reference to the accompanying drawings, other features and aspects of the present disclosure will become clear.

BRIEF DESCRIPTION OF THE DRAWINGS

The drawings are included in the specification and constitute a part of the specification.

Together with the specification, the drawings illustrate exemplary embodiments, features, and aspects of the present disclosure, and are used to explain the principles of the present disclosure.

FIG. 3 is a schematic diagram of a fixed point number representation with an introduced offset according to an embodiment of the present disclosure.

FIG. 4 is a flow chart of a neural network quantization method according to an embodiment of the present disclosure.

DETAILED DESCRIPTION

Figure 1:
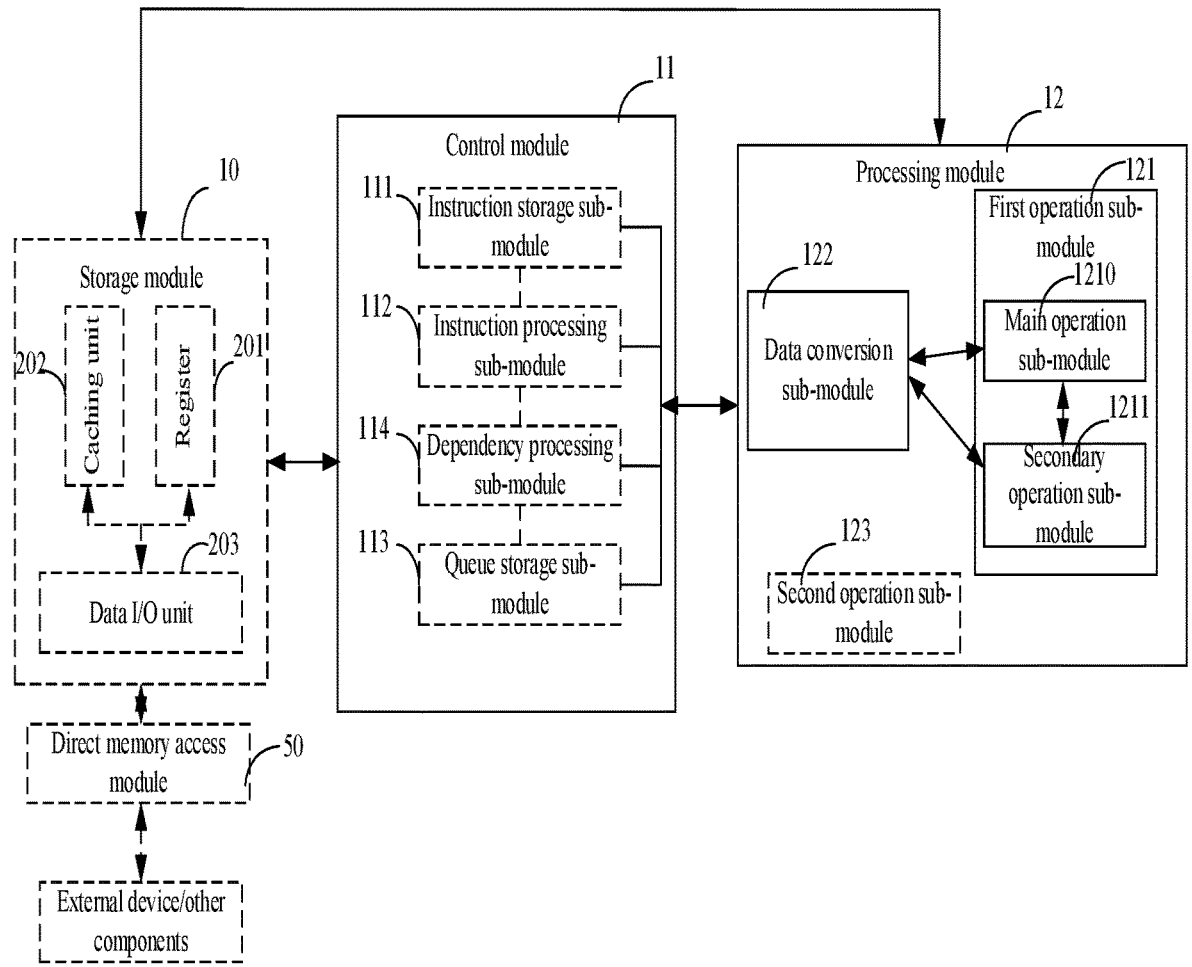
FIG. 1 is a block diagram of a neural network quantization device according to an embodiment of the present disclosure.

Technical solutions in embodiments of the present disclosure will be described clearly and completely hereinafter with reference to the drawings in the embodiments of the present disclosure. The embodiments to be described are merely some of, but not all of embodiments of the present disclosure. All other embodiments derived by those of ordinary skill in the art based on the embodiments of the present disclosure without creative efforts shall fall within the protection scope of the present disclosure.

It should be understood that terms such as "first" and "second" in the claims, the specification, and the drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an" and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once" or "in response to a determination" or "in response to a case where something is detected" depending on the context. Similarly, depending on the context, the clause "if it is determined that" or "if [a described condition or event] is detected" can be interpreted as "once it is determined that", or "in response to a determination", or "once [a described condition or event] is detected", or "in response to a case where [a described condition or event] is detected".

As the complexity of neural network increases, the amount of data and data dimensions constantly increase too. However, since traditional neural network algorithms usually use a floating point number format to perform a neural network operation, the ever-increasing amount of data poses great challenges to the data processing efficiency, storage capacity and access efficiency of the operation device. In order to solve the above-mentioned problems, in the related arts, all data involved in the neural network operation is converted from floating point numbers to fixed point numbers. However, since each piece of data is different from one another, or a same piece of data may change at different stage, the method that merely converts floating point numbers to fixed point numbers may lead to insufficient precision, thus affecting the operation result.

Data to be operated in the neural network is usually in the floating point number format or the fixed point number format with high precision. When the neural network is implemented in a device carrying the neural network, the data to be operated in the floating point number format or the fixed point number format with high precision leads to a large amount of operation and memory access overhead of the neural network operation. In order to improve the operation efficiency, the neural network quantization method, the neural network quantization device, the computer device and the storage medium provided by the embodiments of the present disclosure can perform local quantization on the data to be operated in the neural network according to different types of data to be operated. The quantized data format is usually a fixed point data format with a short bit width and low precision. The amount of operation and memory access can be reduced by performing the neural network operation using the quantized data with low precision. The quantized data format can be a fixed point data format with a short bit width. The data to be operated in the floating point number format may be quantized as the data to be operated in the fixed number format, and the data to be operated in the fixed point format with high precision may be quantized as the data to be operated in the fixed point format with low precision. Performing local quantization on the data by using the corresponding quantization parameter may reduce the storage space occupied by the stored data while ensuring the precision, ensure the accuracy and reliability of the operation result, and improve the efficiency of the operation. In addition, performing quantization also reduces the size of the neural network model and lessens the performance requirements of the terminal running the neural network model, so that the neural network model may be applied to terminals such as mobile phones with relatively limited computing power, size, and power consumption.

It can be understood that the quantization precision refers to the size of the error between the quantized data and the data before quantization. The quantization precision may affect the accuracy of the operation result of the neural network. The higher the quantization precision is, the higher the accuracy of the operation result will be, but the amount of operation and the memory access overhead will also be larger. Compared with the quantized data with a shorter bit width, the quantized data with a longer bit width has a higher quantization precision, and the accuracy is also higher when the quantized data with a longer bit width is used to perform the neural network operation. However, when being used for the neural network operation, the quantized data with a longer bit width requires more operation, the memory access overhead is higher, and the operation efficiency is lower. In the same way, for the same data to be quantized, the quantization precision of the quantized data obtained by using different quantization parameters may be different, which may produce different quantization results, and will also have different effects on the operation efficiency and accuracy of the operation result. When the neural network is being quantized, in order to balance the operation efficiency and the accuracy of the operation result, the bit width of the quantized data and quantization parameters that are more in line with the data characteristics of the data to be operated may be used.

The data to be operated in the neural network includes at least one of a weight, a neuron, a bias, and a gradient. The data to be operated is a matrix including a plurality of elements. In a traditional neural network quantization method, all data to be operated is usually operated after being quantized. When the quantized data is used for operation, only a part of all the quantized data to be operated is used for the operation. For example, in a convolution layer, when the overall quantized input neurons are used for a convolution operation, according to the dimension and step of the convolution kernel, quantized neurons with dimension equivalent to the convolution kernel are extracted from the overall quantized input neurons for the convolution operation. In a fully connected layer, when the overall quantized input neurons are used for a matrix multiplication operation, quantized neurons are extracted row by row from the overall quantized input neuron for the matrix multiplication operation. Therefore, in a traditional neural network quantization method, all the data to be operated is quantized and then operated according to part of the quantized data, which may lead to low operation efficiency. In addition, in order to operate all the data to be operated after all the data to be operated is quantized, all the quantized data to be operated needs to be stored first, which occupies a large storage space.

The neural network quantization method provided in the embodiments of the present disclosure may be applied to a processor. The processor may be a Central Processing Unit (CPU) or an artificial intelligence processor (IPU) for performing artificial intelligence operations. The artificial intelligence operations may include machine learning operations, brain-like operations, and the like. The machine learning operations may include neural network operations, k-means operations, support vector machine operations, and the like. The artificial intelligence processor may include one or more of, for example, a GPU (Graphics Processing Unit), an NPU (Neural-Network Processing Unit), a DSP (Digital Signal Process) unit, and an FPGA (Field-Programmable Gate Array) chip. The present disclosure does not limit the specific types of the processors.

In a possible implementation, the processors mentioned in the present disclosure may include a plurality of processing units, and each processing unit may independently execute various assigned tasks, such as convolution operation task, pooling task, or fully connected task, etc. The present disclosure does not limit the processing unit and the tasks executed by the processing unit.

FIG. 1 is a block diagram of a neural network quantization device according to an embodiment of the present disclosure. As shown in FIG. 1, the device may include a control module 11 and a processing module 12. The processing module 12 may include a first operation sub-module 121. The first operation sub-module 121 may include a main operation sub-module 1210 and a secondary operation sub-module 1211.

The control module 11 is configured to determine a plurality pieces of data to be quantized from target data of the neural network, and obtain a quantization result of the target data according to a piece of quantized data corresponding to each piece of data to be quantized. The piece of quantized data corresponding to each piece of data to be quantized is obtained by quantizing the piece of data to be quantized by using a corresponding quantization parameter. The quantization parameter includes a point location.

The first operation sub-module 121 is configured to perform an operation related to the quantization result to obtain an operation result.

The main operation sub-module 1210 is configured to send first data to the secondary operation sub-module. The first data includes first-style data, which is in the quantization result and is obtained by quantizing according to the point location.

The secondary operation sub-module 1211 is configured to perform multiplication on the received first data to obtain an intermediate result.

The main operation sub-module 1210 is configured to perform an operation on data except for the first data in the intermediate result and the quantization result to obtain an operation result.

The way of determining the plurality pieces of data to be quantized may be determined from the target data according to a task type of the target data, an amount of data required to be operated, a data volume of each piece of the data to be operated, precision requirements based on computational precision, current processing capacity, storage capacity and the like of a terminal, and a type of operation which the data to be operated involved in, and the like.

The layer to be quantized in the neural network may be any layer of the neural network. Some or all of the layers in the neural network may be determined as the layers to be quantized according to requirements. When the neural network includes a plurality of layers to be quantized, the layers to be quantized may be continuous or discontinuous. Different neural networks may have different types of layers to be quantized. For example, the layer to be quantized may be a convolution layer, a fully connected layer, etc. The present disclosure does not limit the count and type of layers to be quantized.

In a possible implementation, the data to be operated may include at least one of a weight, a neuron, a bias, and a gradient. At least one of the neuron, weight, bias, and gradient in the layer to be quantized can be quantized according to requirements. The target data may be any data to be operated and to be quantized. For example, the data be to quantized includes a neuron, a weight and a bias. The neuron and the weight need to be quantized, and the neuron is target data 1, and the weight is target data 2.

When there are various types of target data in the layers to be quantized, the quantization method provided in the present disclosure may be adopted to quantize the various types of target data to obtain the quantized data corresponding to the target data. The quantized data of various types of target data together with the data to be operated that does not need to be quantized are used for performing the operation in the layer to be quantized.

In a possible implementation, the quantization parameter may also include an offset and or a scale factor. The quantization result may also include second-style data. The second-style data includes data of a first part represented by the point location, and data of a second part represented by the offset and/or the scale factor. The first data may also include the first part of the second-style data in the quantization result.

In this implementation, the quantization result is a fixed point number which can be represented by the following data format:

The first-style data: $Fixed\_Style_1 = I \times 2^S$
The second-style data: $Fixed\_Style_2 = I \times 2^S \times f + O$ In the above data format, I represents a fixed point number, which is a n-bit binary representation value of a piece of quantized data (or a quantization result), s represents a point location (including a first-kind point location and a second-kind point location described below), f represents a scale factor (including a first-kind scale factor and a second-kind scale factor described below), and O represents an offset.

The first part of the second-style data is $I \times 2^S$, and the second part of the second-style data is f and o.

An inference stage of the neural network operation may include a stage in which a forward operation is performed on a trained neural network to complete a task. In the inference stage of the neural network, at least one of neuron, weight, bias, and gradient may be used as the data to be quantized and may be quantized according to the quantization method provided in the embodiments of the present disclosure, and then the quantized data is used to complete the operation in the layer to be quantized.

A fine-tuning stage of the neural network operation may include a stage in which forward operations and backward operations of a preset count of iterations are performed on a trained neural network to fine-tune the parameters, so that the neural network can be adapt to the task. In the fine-tuning stage of the neural network operation, at least one of neuron, weight, bias, and gradient may be quantized according to the quantization method provided in the embodiments of the present disclosure, and then the quantized data is used to complete the forward operation and the backward operation in the layer to be quantized.

A training stage of the neural network operation may include a stage in which an iterative training is performed on an initialized neural network to obtain a trained neural network, where the trained neural network may execute specific tasks. In the training stage of the neural network, at least one of neuron, weight, bias, and gradient may be quantized according to the quantization method provided in the embodiments of the present disclosure, and then the quantized data is used to complete the forward operation and the backward operation of the layer to be quantized.

A subset of a piece of target data may be used as the data to be quantized. The piece of target data may be divided into a plurality of subsets in different ways, and each subset may be used as a piece of data to be quantized. A piece of target data may be divided into a plurality of pieces of data to be quantized. The piece of target data may be divided into a plurality of pieces of data to be quantized according to the type of operation to be performed on the piece of target data. For example, when target data needs to be subjected to a convolution operation, the target data may be divided into a plurality pieces of data to be quantized corresponding to the convolution kernel according to the height and width of the convolution kernel. When the target data is a left matrix that requires a matrix multiplication operation, the target data may be divided into a plurality of pieces of data to be quantized by rows. The target data may be divided into a plurality pieces of data to be quantized at one time, or the target data may be divided into a plurality pieces of data to be quantized successively according to the order of operations.

The target data may be also divided into a plurality of pieces of data to be quantized according to a preset data division method. For example, the preset data division method may be: dividing data according to a fixed data size, or dividing data according to a fixed data shape.

After the target data is divided into a plurality of pieces of data to be quantized, each piece of data to be quantized may be quantized separately, and operation may be performed based on data obtained after quantizing the pieces of data to be quantized. The quantization time required for a piece of data to be quantized is shorter than the overall quantization time of the target data. After a piece of data to be quantized is quantized, the piece of quantized data may be used for performing a subsequent operation, instead of performing operations after all the pieces of data to be quantized in the target data are quantized. Therefore, the quantization method in the present disclosure may improve operation efficiency.

The quantization parameter corresponding to the data to be quantized may be a quantization parameter or a plurality of quantization parameters. The quantization parameter may include a parameter used for quantizing the data to be quantized, such as a point location. The point location can be used to determine the location of a decimal point in the quantized data. The quantization parameter may also include a scale factor, an offset, etc.

A method for determining the quantization parameter corresponding to the data to be quantized may include: after determining a quantization parameter corresponding to the target data, determining the quantization parameter corresponding to the target data as the quantization parameter of the data to be quantized. When the layer to be quantized includes a plurality of pieces of target data, each piece of target data may have a corresponding quantization parameter. The quantization parameters corresponding to the plurality of pieces of target data may be different or the same, which is not limited in the present disclosure. After the target data is divided into a plurality of pieces of data to be quantized, the quantization parameter corresponding to the target data may be determined as the quantization parameter corresponding to each piece of data to be quantized. At this time, the quantization parameters corresponding to the different pieces of data to be quantized are the same.

The method for determining the quantization parameter corresponding to the data to be quantized may also include: directly determining the quantization parameter corresponding to each piece of data to be quantized. The target data may not have a corresponding quantization parameter, or the target data may have a corresponding quantization parameter but the data to be quantized does not adopt the quantization parameter of the target data. The quantization parameter may be directly set for each piece of data to be quantized, or the quantization parameter may be obtained by computing according to a piece of data to be quantized. At this time, the quantization parameters corresponding to the different pieces of data to be quantized may be the same or different. For example, when the layer to be quantized is a convolution layer and weights serve as the target data, the weights may be divided into a plurality of pieces of weight data to be quantized according to channels, e.g., channels in a convolutional neural network such as those used in an RGB image, and the pieces of weight data to be quantized of different channels may correspond to different quantization parameters. When the quantization parameters corresponding to the different pieces of data to be quantized are different, after each piece of data to be quantized is quantized according to the corresponding quantization parameter, the quantization result obtained should not affect the operation of the target data.

The method for determining the quantization parameter corresponding to the target data or the method for determining the quantization parameter corresponding to the data to be quantized may include: directly determining the quantization parameter by looking up a preset quantization parameter, determining the quantization parameter by looking up a correspondence, or determining the quantization parameter by computing according to the data to be quantized. The method for determining the quantization parameter corresponding to the data to be quantized is taken as an example for description below.

The quantization parameter corresponding to the data to be quantized may be preset directly. The preset quantization parameter may be stored in a set storage space. The set storage space may be an on-chip or an off-chip storage space. For example, the preset quantization parameter may be stored in the set storage space. When each piece of data to be quantized is being quantized, the corresponding quantization parameter may be fetched from the set storage space for quantization. The quantization parameter corresponding to each type of data to be quantized may be set according to an empirical value, or the stored quantization parameter corresponding to each type of data to be quantized may be updated according to requirements.

The quantization parameter may be determined by looking up the correspondence between the data features and the quantization parameter according to the data features of the respective pieces of data to be quantized. For example, the data to be quantized may have a different quantization parameter when the data to be quantized is sparsely distributed or densely distributed. The quantization parameter corresponding to the data distribution of the data to be quantized may be determined by looking up the correspondence.

In addition, by adopting the set quantization parameter computation method, the quantization parameter corresponding to each layer to be quantized may be obtained according to the respective pieces of data to be quantized. For example, a point location in the quantization parameter may be computed by using a rounding algorithm according to the maximum value of the absolute values of the data to be quantized and the preset data bit width.

A predetermined quantization algorithm may be used to quantize data to be quantized according to a quantization parameter to obtain quantized data. For example, a rounding algorithm may be used as the quantization algorithm to perform rounding quantization on the data to be quantized according to the data bit width and the point location to obtain the quantized data. The rounding algorithm may include rounding up, rounding down, rounding to zero, and rounding off. The present disclosure does not limit the specific implementation of the quantization algorithm.

Each piece of data to be quantized may be quantized according to the corresponding quantization parameter. Since the quantization parameter corresponding to each piece of data to be quantized is more compatible with the features of the piece of data to be quantized, the quantization precision of each type of data to be quantized in each layer to be quantized is more compatible with the operation requirements of the target data, and is thus more compatible with the operation requirements of the layer to be quantized. On the premise of ensuring the accuracy of the operation result of the layer to be quantized, the method may improve the operation efficiency of the layer to be quantized, and may achieve a balance between the operation efficiency of the layer to be quantized and the accuracy of the operation result. Furthermore, the target data may be divided into a plurality of pieces of data, so that each piece of data to be quantized may be quantized separately. After a first piece of data to be quantized is quantized, an operation may be performed according to the quantization result, and at the same time, a second piece of data to be quantized may be quantized. In this way, the overall operation efficiency of the target data may be improved, and the operation efficiency of the layer to be quantized may be improved too.

All pieces of quantized data of the pieces of data to be quantized may be combined to obtain the quantization result of the target data, or a set operation may be performed on all pieces of quantized data of the pieces of data to be quantized to obtain the quantization result of the target data. For example, the pieces of quantized data may be weighted according to a preset weight to obtain the quantization result of the target data, which is not limited in the present disclosure.

In the process of inference, training and fine-tuning of the neural network, the data to be quantized may be quantized offline or online. The offline quantization refers to performing offline processing on data to be quantized by using the quantization parameter. The online quantization refers to performing online processing on the data to be quantized by using the quantization parameter. For example, when the neural network is running on an artificial intelligence chip, the data to be quantized and the quantization parameter may be sent to an operation device outside the artificial intelligence chip for offline quantization, or an operation device outside the artificial intelligence chip may be used to perform offline quantization on the pre-obtained data to be quantized and the quantization parameter. In the process of running the neural network by the artificial intelligence chip, the artificial intelligence chip may use the quantization parameter to perform online quantization on the data to be quantized. The present disclosure does not limit whether the data to be quantized is quantized online or offline.

In the neural network quantization method provided in this embodiment, after the control module divides the target data into a plurality pieces of data to be quantized, the quantization result of the target data may be obtained according to the quantized data corresponding to each piece of data to be quantized, and the first operation sub-module is used to perform an operation related to the quantization result to obtain an operation result. The main operation sub-module is used to send the first data to the secondary operation sub-module, the secondary operation sub-module is used to perform multiplication on the received first data to obtain an intermediate result, and the main operation sub-module is used to perform an operation on data except for the first data in the intermediate result and the quantization result to obtain an operation result. The quantization process of each piece of data to be quantized can be executed in parallel with the operation process of the main operation sub-module and the secondary operation sub-module, which may improve the quantization efficiency and operation efficiency of the target data, and may also improve the quantization efficiency and the operation efficiency of the layer to be quantized and even the entire neural network.

In a possible implementation, the quantization parameter corresponding to the target data may be used for quantization in the process of quantizing the target data. After the target data is divided into a plurality of pieces of data to be quantized, the quantization parameter corresponding to each piece of data to be quantized can be used for quantization. The quantization parameter corresponding to each piece of data to be quantized can be preset or computed according to the data to be quantized. No matter which way is used to determine the quantization parameter corresponding to each piece of data to be quantized, the quantization parameter corresponding to each piece of data to be quantized can be made more compatible with the quantization requirements of the data to be quantized. For example, when the corresponding quantization parameter is obtained according to the target data, the quantization parameter can be obtained by using a maximum value and a minimum value of each element in the target data. When the corresponding quantization parameter is obtained according to the data to be quantized, the maximum value and the minimum value of each element in the data to be quantized can be used to obtain the quantization parameter. The quantization parameter of the data to be quantized can be made more compatible with the data features of the data to be quantized than the quantization parameter of the target data, and can obtain more accurate quantization result of the data to be quantized and higher quantization precision.

In a possible implementation, as shown in FIG. 1, the processing module 12 may further include a data conversion sub-module 122.

The data conversion sub-module 122 is configured to convert a format of data to be converted to obtain converted data. Format styles of the converted data may include any one of a first style and a second style. The data to be converted may include data that is not subjected to quantization in the target data, and the first data may also include first-style converted data and/or a first part of second-style converted data.

The main operation sub-module 1210 is also configured to perform an operation on the intermediate result, the data except for the first data in the intermediate result, and the data except for the first data in the converted data to obtain an operation result.

In this implementation, the data to be converted may also include other data of which data formats are different from the first style and the second style and should be subjected to multiplication together with the quantization result. This is not limited in the present disclosure.

For example, it is assumed that data $Fixed_1$ and $Fixed_2$ are subjected to multiplication, where $Fixed_1 = I_1 \times 2^{S_1}$, $Fixed_2 = I_2 \times 2^{S_2}$. When the data $Fixed_1$ and $Fixed_2$ are subjected to multiplication, $Fixed_1 \times Fixed_2 = I_1 \times 2^{S_1} \times I_2 \times 2^{S_2} = I_1 \times I_2 \times 2^{S_1+S_2}$. The main operation sub-module may send $Fixed_1$ and $Fixed_2$ as the first data to the secondary operation sub-module, so that the secondary operation sub-module can realize the multiplication of $Fixed_1$ and $Fixed_2$ and obtain an intermediate result.

Suppose the data $Fixed_1$ and data $FP_3$ are subjected to multiplication, $FP_3 = Fixed_3 \times f_3 + O_3 = I_3 \times 2^{S_3} \times f_3 + O_3$. When the data $Fixed_1$ and the data $FP_3$ are subjected to multiplication, $Fixed_1 \times FP_3 = f_3 \times Fixed_1 \times Fixed_3 + Fixed_1 \times O_3$. The main operation sub-module may send $Fixed_1$ and $Fixed_3$ as the first data to the secondary operation sub-module, so that the secondary operation sub-module can realize the multiplication of $Fixed_1$ and $Fixed_3$ and obtain an intermediate result.

Suppose data $FP_4$ and data $FP_5$ are subjected to multiplication, $FP_4 = Fixed_4 \times f_4 + O_4 = I_4 \times 2^{S_4} \times f_4 + O_4$, $FP_5 = Fixed_5 \times f_5 + O_5 = I_5 \times 2^{S_5} \times f_5 + O_5$. When the data $FP_4$ and the data $FP_5$ are subjected to multiplication, $FP_4 \times FP_5 = f_4 \times f_5 \times Fixed_4 \times Fixed_5 + Fixed_4 \times f_4 \times o_5 + Fixed_5 \times f_5 \times o_4 + o_4 \times o_5$. The main operation sub-module may send $Fixed_4$ and $Fixed_5$ as the first data to the secondary operation sub-module, so that the secondary operation sub-module can realize the multiplication of $Fixed_4$ and $Fixed_5$ and obtain an intermediate result.

In a possible implementation, the quantization result may be expressed in the first style or the second style format, and the first operation sub-module may directly perform an operation on the quantization result. The quantization result may also be obtained after format conversion of the quantization result to be converted that has not been converted into the first style or the second style. The data conversion sub-module 122 is also used to convert the format of the quantization result obtained from the to-be-converted target data according to the quantized data corresponding to the respective data to be quantized, in order to obtain the quantization result.

In a possible implementation, the control module may determine a plurality pieces of data to be quantized by implementing at least one of the following methods (method 1 to method 5).

Method 1: determining the target data in one or more layers to be quantized as one piece of data to be quantized.

When the neural network includes a plurality of layers to be quantized, a quantized data volume of the data quantized by the terminal each time can be determined according to a target task and precision requirements of the terminal, and then according to the data volume of the target data and the quantized data volume in different quantization layers, the target data in one or more layers to be quantized is determined as one piece of data to be quantized. For example, an input neuron in a layer to be quantized may be determined as one piece of data to be quantized.

Method 2: determining the same kind of data to be operated in one or more layers to be quantized as one piece of data to be quantized.

When the neural network includes a plurality of layers to be quantized, a quantized data volume of the data quantized by the terminal each time can be determined according to a target task and precision requirements of the terminal, and then according to the data volume of the target data and the quantized data volume in different quantization layers, a certain kind of target data in one or more layers to be quantized is determined as one piece of data to be quantized. For example, input neurons in all the layers to be quantized may be determined as one piece of data to be quantized.

Method 3: determining the data in one or more channels in the target data of the corresponding layer to be quantized as one piece of data to be quantized.

When the layer to be quantized is a convolutional layer, the layer to be quantized may contain a channel. According to the channel and the quantized data volume of the data quantized by the terminal each time determined according to the target task and the precision requirements of the terminal, the data in the one or more channels is determined as one piece of data to be quantized. For example, for a certain convolutional layer, the target data in 2 channels can be determined as one piece of data to be quantized, or the target data in each channel can be determined as one piece of data to be quantized.

Method 4: determining one or more batches of data in the target data of the corresponding layer to be quantized as one piece of data to be quantized.

When the layer to be quantized is a convolutional layer, a dimension of an input neuron in the convolutional layer may include batch number (B), channel (C), height (H), and width (W). When there are a plurality of batches of input neurons, each batch of input neurons can be regarded as three-dimensional data with dimensions of channel, height, and width. Each batch of input neurons may correspond to a plurality of convolution kernels, and the number of channels of each batch of input neurons is consistent with the number of channels of corresponding convolution kernels.

For any batch of input neurons and for any one of the plurality of convolution kernels corresponding to the batch of input neurons, part of data (subset) of the batch of input neurons corresponding to the convolution kernel can be determined as a plurality pieces of data to be quantized of the batch of input neurons corresponding to the convolution kernel according to the quantized data volume and the amount of the batch of input neurons. For example, it is assumed that target data B1 has three batches of data, if one batch of data in the target data is determined as one piece of data to be quantized, the target data B1 can be divided into three pieces of data to be quantized.

After the input neurons are divided to obtain all the data to be quantized according to a dimension and a stride of the convolution kernel, the quantization process may be performed in parallel on each piece of data to be quantized. Since the amount of data to be quantized is smaller than that of the input neurons, the computation amount for quantizing a piece of data to be quantized is smaller than the computation amount for overall quantization of the input neurons. Therefore, the quantization speed and the quantization efficiency of the input neurons can be increased by the quantization method in this embodiment. The input neurons may also be divided according to the dimension and the stride of the convolution kernel, and after the plurality pieces of data to be quantized are obtained in sequence, the obtained data to be quantized are respectively subjected to convolution operation with the convolution kernel. The quantization process of each piece of data to be quantized and the convolution operation process can be executed in parallel. Therefore, the quantization efficiency and operation efficiency of the input neurons can be improved by the quantization method in this embodiment.

Method 5: dividing the target data in the corresponding layer to be quantized into one or more pieces of data to be quantized according to a determined division size.

The real-time processing capability of the terminal can be determined and thus the division size can be determined according to the precision requirements of the target task and the terminal. The real-time processing capability of the terminal may include: relevant information that represents the terminal's processing capability of processing the target data, such as the speed at which the terminal quantizes the target data, the speed at which the quantized data is operated, and the amount of data that the terminal can process when the target data is quantized and operated. For example, the size of the data to be quantized can be determined according to the speed of quantizing the target data and the speed of operating the quantized data, so that the speed of quantizing the data to be quantized is the same as the speed of computing the quantized data. In this way, the quantization and the operation can be performed synchronously, which can improve the operation efficiency of the target data. The stronger the real-time processing capability of the terminal is, the larger the size of the data to be quantized will be.

In this embodiment, the method for determining the data to be quantized can be set as required. The data to be quantized may include a kind of data to be operated, such as an input neuron. (It may also be weight, bias, gradient. The input neuron is taken as an example below). The data to be operated may be part or all of the input neurons in a certain layer to be quantized, or it may include all or part of the input neurons in each layer to be quantized in a plurality of layers to be quantized. The data to be quantized may also be all or part of the input neurons corresponding to a certain channel of the layers to be quantized, or all input neurons corresponding to several channels of the layers to be quantized. The data to be quantized may also be part or all of a certain input neuron, etc. In other words, the target data can be divided in any method, and this is not limited in the present disclosure.

In a possible implementation, as shown in FIG. 1, the processing module 12 may further include a second operation sub-module 123. The second operation sub-module 123 is configured to perform an operation processing in the device except for the operation processing performed by the first operation sub-module.

Through the above method, the first operation sub-module is used to perform multiplication between the first and second styles of fixed point data, and the second operation sub-module is used to perform other operation processing, which can increase the efficiency and speed of the operation performed on the data by the device.

In a possible implementation, as shown in FIG. 1, the control module 11 may further include an instruction storage sub-module 111, an instruction processing sub-module 112 and a queue storage sub-module 113.

The instruction storage sub-module 111 is configured to store an instruction corresponding to the neural network.

The instruction processing sub-module 112 is configured to parse the instruction to obtain an operation code and an operation field.

The queue storage sub-module 113 is configured to store an instruction queue. The instruction queue may include a plurality of instructions to be executed which are arranged in an execution order, and the plurality of instructions to be executed may include instructions corresponding to the neural network.

In this implementation, the execution order of the plurality of instructions to be executed can be arranged according to receiving time, priority level and the like of the instructions to be executed to obtain an instruction queue, so that the plurality of instructions to be executed can be executed in order according to the instruction queue.

In a possible implementation, as shown in FIG. 1, the control module 11 may include a dependency processing sub-module 114.

The dependency processing sub-module 114 is configured to cache a first instruction to be executed in the instruction storage sub-module 111 when it is determined that there is correlation between the first instruction to be executed and a zeroth instruction to be executed before the first instruction to be executed in the plurality of instructions to be executed, and extract the first instruction to be executed from the instruction storage sub-module 111 and send to the processing module 12 after the zeroth instruction to be executed is executed. The first instruction to be executed and the zeroth instruction to be executed are instructions in the plurality of instructions to be executed.

The correlation between the first instruction to be executed and the zeroth instruction to be executed before the first instruction to be executed may include: there is an overlapping area between a first storage address interval that stores data required by the first instruction to be executed and a zeroth storage address interval that stores data required by the zeroth instruction to be executed. Conversely, if there is no correlation between the first instruction to be executed and the zeroth instruction to be executed, the first storage address interval and the zeroth storage address interval may have no overlapping area.

In this way, according to the dependency among the instructions to be executed, subsequent instructions to be executed can be executed after previous instructions to be executed are executed, thereby ensuring the precision of the operation result.

In a possible implementation, as shown in FIG. 1, the device may further include a storage module 10. The storage module 10 is configured to store operation data related to neural network operation such as a quantization parameter, data to be operated, and a quantization result.

In this implementation, the storage module may include one or more of a caching unit 202 and a register 201. The caching unit 202 may include a high-speed temporary caching unit, and may also include at least one NRAM (Neuron Random Access Memory). The caching unit 202 may be configured to store operation data, and the register 201 may be configured to store scalars in the operation data.

In a possible implementation, the caching unit may include a neuron caching unit. The neuron caching unit, which is the aforementioned NRAM, may be configured to store neuron data in the operation data, and the neuron data may include neuron vector data.

In a possible implementation, the storage module 10 may include a data I/O unit 203 configured to control input and output of the operation data.

In a possible implementation, the device may also include a direct memory access module 50, which is configured to read or store data from the storage module, read or store data from an external device/other components, so as to implement data transfer between the storage module and the external device/other components.

In a possible implementation, the control module may include a parameter determination sub-module. The parameter determination sub-module is configured to compute the corresponding quantization parameter according to each piece of data to be quantized and the corresponding data bit width.

In the implementation, statistical analysis may be performed on the data to be quantized, and the quantization parameter corresponding to the data to be quantized may be determined according to a statistical result and the data bit width. The quantization parameter may include one or more of the point location, the scale factor, and the offset.

In a possible implementation, the parameter determination sub-module may include a first point location determination sub-module, which is configured to, when the quantization parameter does not include the offset, obtain a first-kind position location of each piece of data to be quantized according to a maximum value $Z_1$ of an absolute value of each piece of data to be quantized and a corresponding data bit width. The maximum value $Z_1$ of the absolute value, is the maximum value obtained by taking the absolute value of the data to be quantized.

In the implementation, when the data to be quantized is data symmetrical with respect to an origin, e.g., an origin in a coordinate system, the quantization parameter may not include the offset. It is assumed that $A_1$ is the maximum value of the absolute value of the elements of the data to be quantized, n is the data bit width corresponding to the data to be quantized, and $A_1$ is the maximum value that can be represented by the quantized data after the data to be quantized is quantized according to the data bit width n, $A_1$ is $2^{s_1}(2^{n-1}-1)$, $A_1$ needs to include $A_1$, and $A_1$ must be greater than $$\frac{A_1}{2}.$$

Therefore, mere is a constraint of formula (1):

$$2^{s_1}(2^{n-1}-1) \geq Z_1 > 2^{s_1-1}(2^{n-1}-1) \qquad \text{Formula (1)}.$$

The processor may compute the first-kind point location $s_1$ according to the maximum value of the absolute value $Z_1$ and the data bit width n of the data to be quantized. For example, the following formula (2) may be used to compute the first-kind point location $s_1$ corresponding to the data to be quantized:

$$s_1 = \text{ceil}\left(\log_2\left(\frac{Z_1}{2^{n-1}-1}\right)\right). \quad \text{Formula (2)}$$

In this formula, ceil denotes a rounding up operation, $Z_1$ denotes the maximum value of the absolute value of the data to be quantized, $s_1$ denotes the first-kind point location, and n denotes the data bit width.

In a possible implementation, the parameter determination sub-module may include a second point location determination sub-module configured to, when the quantization parameter includes the offset, obtain a second-kind point location $s_2$ of each piece of data to be quantized according to the maximum value and the minimum value of each piece of data to be quantized and the corresponding data bit width.

In the implementation, the maximum value $Z_{max}$ and minimum value $Z_{min}$ of the data to be quantized may be obtained first, and then the following formula (3) is used to perform an operation according to the maximum value $Z_{max}$ and minimum value $Z_{min}$:

$$Z_2 = \frac{Z_{max} - Z_{min}}{2}. \quad \text{Formula (3)}$$

Further, according to $Z_2$ obtained from computation and the corresponding data bit width, the second-kind point location $s_2$ is obtained by using the following formula (4):

$$s_2 = \text{ceil}\left(\log_2\left(\frac{Z_2}{2^{n-1}-1}\right)\right). \quad \text{Formula (4)}$$

In this implementation, normally the maximum value and minimum value of the data to be quantized are stored during quantization, so that the maximum value of the absolute value can be obtained directly based on the stored maximum value and minimum value of the data to be quantized. In this case, there is no need to consume extra resources to find the absolute value of the data to be quantized, which may save the time spent on determining the statistical result.

In a possible implementation, the parameter determination sub-module may include:

a first maximum value determination sub-module configured to, when the quantization parameter does not include the offset, obtain the maximum value of the piece of quantized data according to each piece of data to be quantized and the corresponding data bit width; and a first scale factor determination sub-module configured to obtain a first-kind scale factor f' of each piece of data to be quantized according to the maximum value of the absolute value of each piece of data to be quantized and the maximum value of the piece of quantized data, where the first-kind scale factor f' may include a first scale factor $f_1$ and a second scale factor $f_2$.

The first scale factor $f_1$ may be computed according to the following formula (5):

$$f_1 \frac{Z_1}{A_1} = \frac{Z_1}{2^{s_1}(2^{n-1}-1)} \quad \text{Formula (5)}$$

The second scale factor $f_2$ may be computed according to the following formula (6):

$$f_2 = 2^{s_1} \times f_1 \quad \text{Formula (6)}$$

In a possible implementation, the parameter determination sub-module may include:

an offset determination sub-module configured to obtain the offset of each piece of data to be quantized according to the maximum value and minimum value of each piece of data to be quantized.

Figure 2:
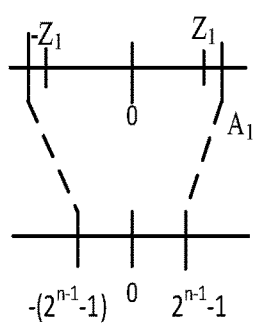
FIG. 2 is a schematic diagram of a symmetric fixed point number representation according to an embodiment of the present disclosure.

In the implementation, FIG. 2 is a schematic diagram of a symmetric fixed point number representation according to an embodiment of the present disclosure. As shown in FIG. 2, the number field of the data to be quantized is distributed with "0" as the symmetric center. $Z_1$ is the maximum value of the absolute value of all floating point numbers in the number field of the data to be quantized. In FIG. 2, $A_1$ denotes the maximum value of a floating point number that can be represented by an n-bit fixed point number $1_x \times 2^s$; and after being converted to a fixed point number, the floating point number $A_1$ becomes $(2^{n-1}-1)$. In order to avoid an overflow, $A_1$ needs to include $Z_1$. In a practical operation, the floating point data of a neural network operation tends to be normally distributed in a certain interval, but the floating point data is not necessarily distributed with "0" as the symmetric center. In this case, when the floating point data are represented by fixed point numbers, an overflow is likely to occur. In order to improve this situation, an offset is introduced in the quantization parameter. FIG. 3 shows a schematic diagram represented by fixed point numbers with introduced offset according to an embodiment of the present disclosure. As shown in FIG. 3, the number field of the data to be quantized is not distributed with "0" as the symmetric center, $Z_{min}$ is the minimum value among all floating point numbers in the number field of the data to be quantized, $Z_{max}$ is the maximum value among all floating point numbers in the number field of the data to be quantized, $A_2$ is the maximum value among the translated floating point numbers represented by an n-bit fixed point number, $A_2$ is $2^{s_2}(2^{n-1}-1)$, and P is a center point between $Z_{min} \sim Z_{max}$. In order to avoid data overflow, the number field of the data to be quantized is translated globally, so that the number field of the translated data to be quantized is distributed with "0" as the symmetric center. The maximum value of the absolute value in the number field of the translated data to be quantized is $Z_2$. As shown in FIG. 3, the offset is the horizontal distance between the "0" point and the "P" point. This distance is called offset o.

According to the minimum value $Z_{min}$ and the maximum value $Z_{max}$, the offset can be computed by using the following formula (7):

$$o = \frac{Z_{max} + Z_{min}}{2} \quad \text{Formula (7)}$$

In this formula, o represents the offset, $Z_{min}$ denotes the minimum value among all the elements of the data to be quantized, and $Z_{max}$ represents the maximum value among all the elements of the data to be quantized.

In a possible implementation, the parameter determination sub-module may include:

a second maximum value determination sub-module configured to, when the quantization parameter includes the offset, obtain the maximum value of the piece of quantized data according to each piece of data to be quantized and the corresponding data bit width; and a second scale factor determination sub-module configured to obtain a second-kind scale factor f" of each piece of data to be quantized according to the maximum value and the minimum value of the piece of data to be quantized, and the maximum value of the piece of quantized data, where the second-kind scale factor f" may include a third scale factor $f_3$ and a fourth scale factor $f_4$.

In the implementation, when the quantization parameter includes the offset, $A_2$ denotes the maximum value that can be represented by the quantized data after the translated data to be quantized is quantized according to the data bit width n, $A_2$ is $2^{s_2}(2^{n-1}-1)$. The maximum value of the absolute value $Z_2$ in the number field of the translated data to be quantized may be computed according to the maximum value $Z_{max}$ and the minimum value $Z_{min}$ of the data to be quantized, and then the third scale factor $f_3$ may be computed according to the following formula (8):

$$f_3 = \frac{Z_2}{A_2} = \frac{Z_2}{2^{s_2}(2^{n-1}-1)}. \quad \text{Formula (8)}$$

Further, the fourth scale factor $f_4$ may be computed according to the following formula (9):

$$f_4 = \frac{Z_2}{(2^{n-1}-1)}. \quad \text{Formula (9)}$$

When the data to be quantized is being quantized, the data used for quantization may differ due to different quantization parameters being adopted.

In a possible implementation, the quantization parameter may include the first-kind point location $s_1$. The following formula (10) may be used to quantize the data to be quantized to obtain the quantized data $I_x$:

$$I_x = \text{round}\left(\frac{F_x}{2^{s_1}}\right). \quad \text{Formula (10)}$$

In this formula, $I_x$ is quantized data that belongs to the first-style data, $F_x$ denotes the data to be quantized, round denotes a rounding off operation.

When the quantization parameter includes the first-kind point location $s_1$, the quantized data of the target data may be de-quantized according to formula (11) to obtain the de-quantized data of the target data $\widehat{F_x}$:

$$\widehat{F_x} = \text{round}\left(\frac{F_x}{2^{s_1}}\right) \times 2^{s_1}. \quad \text{Formula (11)}$$

In a possible implementation, the quantization parameter may include the first-kind point location and the first scale factor. The following formula (12) may be used to quantize the data to be quantized to obtain the quantized data $I_x$:

$$I_x = \text{round}\left(\frac{F_x}{2^{s_1} \times f_1}\right). \quad \text{Formula (12)}$$

When the quantization parameter includes the first-kind point location and the first scale factor, the quantized data of the target data may be de-quantized according to formula (13) to obtain the de-quantized data of the target data $\widehat{F_x}$:

$$\widehat{F_x} = \text{round}\left(\frac{F_x}{2^{s_1} \times f_1}\right) \times 2^{s_1} \times f_1. \quad \text{Formula (13)}$$

In a possible implementation, the quantization parameter may include the second scale factor. The following formula (14) may be used to quantize the data to be quantized to obtain the quantized data $I_x$:

$$I_x = \text{round}\left(\frac{F_x}{f_2}\right). \quad \text{Formula (14)}$$

When the quantization parameter includes the second scale factor, the quantized data of the target data may be de-quantized according to formula (15) to obtain the de-quantized data of the target data $\widehat{F_x}$:

$$\widehat{F_x} = \text{round}\left(\frac{F_x}{f_2}\right) \times f_2. \quad \text{Formula (15)}$$

In a possible implementation, the quantization parameter may include the offset. The following formula (16) may be used to quantize the data to be quantized to obtain the quantized data $I_x$:

$$I_x = \text{round}(F_x - o) \quad \text{Formula (16).}$$

When the quantization parameter includes the offset, the quantized data of the target data may be de-quantized according to formula (17) to obtain the de-quantized data of the target data $\widehat{F_x}$:

$$\widehat{F_x} = \text{round}(F_x - o) + o \quad \text{Formula (17).}$$

In a possible implementation, the quantization parameter may include the second-kind point location and the offset. The following formula (18) may be used to quantize the data to be quantized to obtain the quantized data $I_x$:

$$I_x = \text{round}\left(\frac{F_x - o}{2^{s_2}}\right). \quad \text{Formula (18)}$$

When the quantization parameter includes the second-kind point location and the offset, the quantized data of the target data may be de-quantized according to formula (19) to obtain the de-quantized data of the target data $\widehat{F_x}$:

$$\widehat{F_x} = \text{round}\left(\frac{F_x - o}{2^{s_2}}\right) \times 2^{s_2} + o. \quad \text{Formula (19)}$$

In a possible implementation, the quantization parameter may include the second-kind scale factor f" and the offset o. The following formula (20) may be used to quantize the data to be quantized to obtain the quantized data $I_x$:

$$\widehat{F_x} = \text{round}\left(\frac{F_x - o}{f''}\right). \quad \text{Formula (20)}$$

When the quantization parameter includes the second-kind scale factor and the offset, the quantized data of the target data may be de-quantized according to formula (21) to obtain the de-quantized data of the target data $\hat{F_x}$:

$$\hat{F_x} = \text{round}\left(\frac{F_x - o}{f''}\right) \times f'' + o. \qquad \text{Formula (21)}$$

In a possible implementation, the quantization parameter may include the second-kind scale factor, the second-kind scale factor, and the offset. The following formula (22) may be used to quantize the data to be quantized to obtain the quantized data $I_x$:

$$I_x = \text{round}\left(\frac{F_x - o}{2^{s_2} \times f''}\right). \qquad \text{Formula (22)}$$

When the quantization parameter includes the second-kind point location, the second-kind scale factor, and the offset, the quantized data of the target data may be de-quantized according to formula (23) to obtain the de-quantized data of the target data $\hat{F_x}$:

$$\hat{F_x} = \text{round}\left(\frac{F_x - o}{2^{s_2} \times f''}\right) \times 2^{s_2} \times f'' + o. \qquad \text{Formula (23)}$$

It is understandable that other rounding operation methods such as rounding up, rounding down, and rounding to zero may also be used to replace the rounding off operation round in the formulas above. It can be understood that, in the case of a certain data bit width, for the quantized data obtained according to the point location, the more the decimal places are, the greater the quantization precision of the data to be quantized will be.

In a possible implementation, the control module may also determine the quantization parameter corresponding to each type of data to be quantized in the layer to be quantized by looking up the correspondence between the data to be quantized and the quantization parameter.

In a possible implementation, the quantization parameter corresponding to each type of data to be quantized in each layer to be quantized may be a stored preset value. A correspondence between the data to be quantized and the quantization parameter may be established for the neural network. The correspondence may include the correspondence between each type of data to be quantized in each layer to be quantized and the quantization parameter, and the correspondence may be stored in a storage space that each layer may share and access. It is also possible to establish correspondences among a plurality of pieces of data to be quantized and the quantization parameters for the neural network, and each layer to be quantized corresponds to one of the correspondences. The correspondence of each layer may be stored in a storage space exclusive to this layer, or the correspondence of each layer may be stored in a storage space that each layer may share and access.

The correspondence between the data to be quantized and the quantization parameter may include the correspondences among a plurality of pieces of data to be quantized and a plurality of corresponding quantization parameters. For example, the correspondence A between the data to be quantized and the quantization parameter may include a neuron and a weight of a layer 1 to be quantized. The neuron corresponds to a point location 1, a scale factor 1, and an offset 1, and the weight corresponds to a point location 2 and an offset 2. The present disclosure does not limit the specific format of the correspondence between the data to be quantized and the quantization parameter.

In this embodiment, the quantization parameter corresponding to each type of data to be quantized in the layer to be quantized may be determined by looking up the correspondence between the data to be quantized and the quantization parameter. The corresponding quantization parameter may be preset for each layer to be quantized, and stored based on the correspondence for use by the layer to be quantized after looking up the parameter. The method of obtaining the quantization parameter provided in the embodiment is simple and convenient.

In a possible implementation, the control module further may include a first quantization error determination sub-module, an adjustment bit width determination sub-module, and an adjustment quantization parameter determination sub-module.

The first quantization error determination sub-module is configured to determine a quantization error corresponding to each piece of data to be quantized according to each piece of data to be quantized and the piece of quantized data corresponding to each piece of data to be quantized.

The quantization error of the data to be quantized may be determined according to an error between the quantized data corresponding to the data to be quantized and the data to be quantized. The quantization error of the data to be quantized may be computed using a set error computation method such as a standard deviation computation method and a root-mean-square error computation method.

The quantization error of the data to be quantized may also be determined as described below:

according to the quantization parameter, de-quantizing the quantized data corresponding to the data to be quantized to obtain the de-quantized data, and then, using the formula (24) to determine the quantization error of the data to be quantized $\text{diff}_{bit}$ according to the error between the de-quantized data and the data to be quantized.

$$\text{diff}_{bit} = \log_2\left(\frac{\sum_i |\hat{F_i}| - \sum_i |F_i|}{\sum_i |F_i|} + 1\right) \qquad \text{Formula (24)}$$

In this formula, $F_i$ denotes the floating point value corresponding to the data to be quantized, in which i denotes the subscript of the data to be quantized. $\hat{F_i}z_i^{(n)}$ denotes the de-quantized data corresponding to the floating point value.

The quantization error $\text{diff}_{bit}$ may also be determined by using the formula (25) according to a quantization interval, a count of quantized data, and the corresponding data to be quantized.

$$\text{diff}_{bit} = \log_2\left(\frac{C * 2^{-1} * m}{\sum_i |F_i|}\right). \qquad \text{Formula (25)}$$

In this formula, C denotes the quantization interval, m denotes the count of quantized data, $F_i$ denotes the floating point value corresponding to the data to be quantized, in which denotes the subscript of the data to be quantized.

The quantization error diff$_{bit}$ may also be determined by using the formula (26) according to the quantized data and the corresponding de-quantized data.

$$diff_{bit} = \log_2\left(\frac{\sum_i |\hat{F}_i - F_i|}{\sum_i |F_i|} + 1\right). \quad \text{Formula (26)}$$

In this formula, $F_i$ denotes the floating point value corresponding to the data to be quantized, in which i denotes the subscript of the data to be quantized. $\hat{F}_i$ denotes the de-quantized data corresponding to the floating point value.

The adjustment bit width determination sub-module is configured to adjust the data bit width of each piece of data to be quantized to obtain an adjusted bit width corresponding to each piece of data to be quantized according to the quantization error and an error threshold of to each piece of data to be quantized.

The error threshold may be determined according to the empirical value, and the error threshold may be used to indicate an expected value of the quantization error. When the quantization error is greater than or less than the error threshold, the data bit width corresponding to the data to be quantized may be adjusted to obtain the adjusted bit width corresponding to the data to be quantized. The data bit width may be adjusted to a longer bit width or a shorter bit width to increase or decrease the quantization precision.

The error threshold may be determined according to a maximum acceptable error. When the quantization error is greater than the error threshold, it means that the quantization precision cannot meet the expectation, and the data bit width needs to be adjusted to a longer bit width. A small error threshold may be determined based on a high quantization precision. When the quantization error is less than the error threshold, it means that the quantization precision is high, which may affect the operation efficiency of the neural network. In this case, the data bit width may be adjusted to a shorter bit width to appropriately reduce the quantization precision and improve the operation efficiency of the neural network.

The data bit width may be adjusted according to a stride with fixed bits, or the data bit width may be adjusted according to a variable adjustment stride according to the difference between the quantization error and the error threshold. This is not limited in the present disclosure.

The adjustment quantization parameter determination sub-module is configured to update the data bit width corresponding to each piece of data to be quantized to a corresponding adjusted bit width, and compute a corresponding adjusted quantization parameter according to each piece of data to be quantized and the corresponding adjusted bit width, so that each piece of data to be quantized is quantized according to the corresponding adjusted quantization parameter.

After the adjusted bit width is determined, the data bit width corresponding to the data to be quantized may be updated to the adjusted bit width. For example, when the data bit width of the data to be quantized before updating is 8 bits, and the adjusted bit width is 12 bits, then the data bit width corresponding to the data to be quantized after updating is 12 bits. The adjusted quantization parameter corresponding to the data to be quantized may be obtained by computing according to the adjusted bit width and the data to be quantized. The data to be quantized may be re-quantized according to the adjusted quantization parameter corresponding to the data to be quantized to obtain the quantized data with higher or lower quantization precision, so that a balance between the quantization precision and the processing efficiency may be achieved in the layer to be quantized.

In the process of inference, training and fine-tuning of the neural network, the data to be quantized between each layer may be considered to have a certain correlation. For example, when the difference between the means of the data to be quantized of the respective layers is less than a set mean threshold, and the difference between the maximum values of the data to be quantized in the respective layers is also less than a set difference threshold, the adjusted quantization parameter of a layer to be quantized may be used as the adjusted quantization parameter of one or more subsequent layers for quantizing the data to be quantized in the one or more subsequent layers after the layer to be quantized. In the training and fine-tuning process of the neural network, the adjusted quantization parameter in the layer to be quantized obtained during a current iteration may also be used to quantize the layer to be quantized in subsequent iterations.

In a possible implementation, the control module is further configured to adopt the quantization parameter of the layer to be quantized in one or more layers after the layer to be quantized.

The quantization of the neural network according to the adjusted quantization parameter may include re-quantizing the data to be quantized by using the adjusted quantization parameter only in the layer to be quantized, and using the re-obtained quantized data for the operation of the layer to be quantized. The quantization of the neural network according to the adjusted quantization parameter may also include: instead of re-quantizing the data to be quantized by using the adjusted quantization parameter in the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. The quantization of the neural network according to the adjusted quantization parameter may also include: re-quantizing the data to be quantized by using the adjusted quantization parameter in the layer to be quantized, and using the re-obtained quantized data for the operation of the layer to be quantized, quantizing the data to be quantized by using the adjusted quantization parameter in one or more subsequent layers after the layer to be quantized, and/or quantizing the data to be quantized by using the adjusted quantization parameter in the layer to be quantized during the subsequent iterations. This is not limited in the present disclosure.

In the embodiment, the data bit width may be adjusted according to the error between the data to be quantized and the quantized data corresponding to the data to be quantized, and the adjusted quantization parameter may be obtained by computing according to the adjusted data bit width. By setting different error thresholds, different adjusted quantization parameters may be obtained to achieve different quantization requirements such as improving quantization precision or improving the operation efficiency. The adjusted quantization parameter obtained by computing according to the data to be quantized and the quantized data corresponding to the data to be quantized may be more compatible with the data features of the data to be quantized. In this way, a quantization result that is more in compliance with the needs of the data to be quantized may be obtained, and a better balance between the quantization precision and the processing efficiency may be achieved.

In a possible implementation, the adjustment bit width determination sub-module may include a first adjustment bit width determination sub-module. The first adjustment bit width determination sub-module is configured to, when the quantization error is greater than a first error threshold, increase the corresponding data bit width to obtain the corresponding adjusted bit width.

The first error threshold may be determined according to the maximum acceptable quantization error. The quantization error may be compared with the first error threshold. When the quantization error is greater than the first error threshold, the quantization error may be considered unacceptable. In this case, the quantization precision needs to be improved. By increasing the data bit width corresponding to the data to be quantized, the quantization precision of the data to be quantized may be improved.

The data bit width corresponding to the data to be quantized may be increased according to a fixed adjustment stride to obtain the adjusted bit width. The fixed adjustment stride may be N bits, where N is a positive integer. Each time the data bit width is adjusted, the data bit width may increase by N bits, and the data bit width after each increase=the original data bit width+N bits.

The data bit width corresponding to the data to be quantized may be increased according to a variable adjustment stride to obtain the adjusted bit width. For example, when the difference between the quantization error and the error threshold is greater than the first error threshold, the data bit width may be adjusted according to an adjustment stride M1; when the difference between the quantization error and the error threshold is less than the first error threshold, the data bit width may be adjusted according to an adjustment stride M2, in which the first error threshold is greater than the second error threshold, and M1 is greater than M2. The variable adjustment stride may be determined according to requirements. The present disclosure does not limit the adjustment stride of the data bit width and whether the adjustment stride is variable.

The adjusted quantization parameter may be obtained by computing the data to be quantized according to the adjusted bit width. The quantized data obtained by re-quantizing the data to be quantized according to the adjusted quantization parameter has higher quantization precision than the quantized data obtained by using the quantization parameter before adjustment.

In a possible implementation, the control module may further include a first adjusted quantization error sub-module and a first adjustment bit width loop determination module.

The first adjusted quantization error sub-module is configured to compute an adjusted quantization error of each piece of data to be quantized according to the piece of data to be quantized and the corresponding adjusted bit width.

The first adjustment bit width loop determination module is configured to continue to increase the corresponding adjusted bit width according to the adjusted quantization error and the first error threshold until the adjusted quantization error is less than or equal to the first error threshold.

When the data bit width corresponding to the data to be quantized is increased according to the quantization error, the adjusted bit width is obtained after the bit width is adjusted once. The adjusted quantization parameter is obtained by computing according to the adjusted bit width. The adjusted quantized data is obtained by quantizing the data to be quantized according to the adjusted quantization parameter, and then the adjusted quantization error of the data to be quantized is obtained by computing according to the adjusted quantized data and the data to be quantized. The adjusted quantization error may still be greater than the first error threshold, in other words, the data bit width obtained after the bit width is adjusted once may not meet the adjustment purpose. When the adjusted quantization error is still greater than the first error threshold, the adjusted data bit width may continue to be adjusted. In other words, the data bit width corresponding to the data to be quantized may be increased multiple times, until the adjusted quantization error obtained according to the final obtained adjusted bit width and the data to be quantized is smaller than the first error threshold.

The adjustment stride that the data bit width increases by multiple times may be a fixed adjustment stride or a variable adjustment stride. For example, the final data bit width equals the original data bit width+B*N bits, where N is a fixed adjustment stride that the original data bit width increases by each time, and B is the increase times of data bit width. The final data bit width equals the original data bit width+M1+M2+ . . . +Mm, in which M1, M2, . . . , Mm are variable adjustment strides that the original data bit width increases by each time.

In the embodiment, when the quantization error is greater than the first error threshold, the data bit width corresponding to the data to be quantized is increased to obtain the adjusted bit width corresponding to the data to be quantized. The data bit width may be increased by setting the first error threshold and the adjustment stride, so that the adjusted data bit width can meet the quantization requirement. When one adjustment does not meet the adjustment requirement, the data bit width may also be adjusted many times. The setting of the first error threshold and the adjustment stride makes it possible to flexibly adjust the quantization parameter according to the quantization requirements so that different quantization requirements may be met and the quantization precision may be adaptively adjusted according to the data features of the data to be quantized.

In a possible implementation, the adjustment bit width determination sub-module may include:

a second adjustment bit width determination sub-module configured to, when the quantization error is less than a second error threshold, increase the corresponding data bit width to obtain the corresponding adjusted bit width, where the second error threshold is less than the first error threshold.

The second error threshold may be determined according to the acceptable quantization error and the expected operation efficiency of the neural network. The quantization error may be compared with the second error threshold. When the quantization error is less than the second error threshold, it can be considered that the quantization error is better than the expectation, but the operation efficiency is too low to be acceptable. The operation efficiency of the neural network may be improved by decreasing the quantization precision. The quantization precision of the data to be quantized may be decreased by decreasing the data bit width corresponding to the data to be quantized.

The data bit width corresponding to the data to be quantized may be decreased according to a fixed adjustment stride to obtain the adjusted bit width. The fixed adjustment stride may be N bits, where N is a positive integer. Each time the data bit width is adjusted, the data bit width may decrease by N bits. The data bit width after decreasing equals the original data bit width—N bits.

The data bit width corresponding to the data to be quantized may be decreased according to a variable adjustment stride to obtain the adjusted bit width. For example, when the difference between the quantization error and the error threshold is greater than the first error threshold, the data bit width may be adjusted according to an adjustment stride M1; when the difference between the quantization error and the error threshold is less than the first error threshold, the data bit width may be adjusted according to an adjustment stride M2, where the first error threshold is greater than the second error threshold, and M1 is greater than M2. The variable adjustment stride may be determined according to requirements. The present disclosure does not limit the adjustment stride of the data bit width and whether the adjustment stride is variable.

The adjusted quantization parameter may be obtained by computing the data to be quantized according to the adjusted bit width; the quantized data obtained by re-quantizing the data to be quantized using the adjusted quantization parameter has higher quantization precision than the quantized data obtained by using the quantization parameter before adjustment.

In a possible implementation, the control module further may include a second adjusted quantization error sub-module, and a second adjustment bit width loop determination sub-module.

The second adjusted quantization error sub-module is configured to compute the adjusted quantization error of the data to be quantized according to the adjusted bit width and the data to be quantized.

The second adjustment bit width loop determination sub-module is configured to continue to decrease the adjusted bit width according to the adjusted quantization error and the second error threshold until the adjusted quantization error obtained according to the adjusted bit width and the data to be quantized is greater than or equal to the second error threshold.

When the data bit width corresponding to the data to be quantized is decreased according to the quantization error, the adjusted bit width is obtained after the bit width is adjusted once; the adjusted quantization parameter is obtained by computing according to the adjusted bit width; the adjusted quantized data is obtained by quantizing the data to be quantized according to the adjusted quantization parameter; and then the adjusted quantization error of the data to be quantized is obtained by computing according to the adjusted quantized data and the data to be quantized. The adjusted quantization error may still be less than the first error threshold, in other words, the data bit width obtained after the bit width is adjusted once may not meet the adjustment purpose. When the adjusted quantization error is still less than the first error threshold, the adjusted data bit width may continue to be adjusted. In other words, the data bit width corresponding to the data to be quantized may be decreased many times, until the adjusted quantization error obtained according to the final obtained adjusted bit width and the data to be quantized is greater than the first error threshold.

The adjustment stride that the data bit width decreased by for multiple times may be a fixed adjustment stride or a variable adjustment stride. For example, the final data bit width equals the original data bit width-B*N bits, where N is a fixed adjustment stride that the original data bit width decreases by each time, and B is the decrease times of data bit width. The final data bit width equals the original data bit width-M2-...-Mm, where M1, M2, ..., Mm are variable adjustment strides that the original data bit width decreases by each time.

In the embodiment, when the quantization error is less than the second error threshold, the data bit width corresponding to the data to be quantized is decreased to obtain the adjusted bit width corresponding to the data to be quantized. The data bit width may be decreased by setting the second error threshold and the adjustment stride, so that the adjusted data bit width can meet the quantization requirement. When one adjustment cannot not meet the adjustment requirement, the data bit width may be adjusted multiple times. The setting of the second error threshold and the adjustment stride enables the quantization parameter to be flexibly adjusted according to quantization requirements to meet different quantization requirements, so that the quantization precision may be adjusted, and a balance between the quantization precision and the operation efficiency of the neural network may be achieved.

In a possible implementation, the control module is configured to, when the quantization error is greater than the first error threshold, increase the data bit width corresponding to the data to be quantized; when the quantization error is smaller than the second error threshold, decrease the data bit width corresponding to the data to be quantized; and then obtain the adjusted bit width corresponding to the data to be quantized.

Two error thresholds may be set at the same time, where the first error threshold is used to indicate that the quantization precision is too low, in which case the data bit width may be increased; and where the second error threshold is used to indicate that the quantization precision is too high, in which case the data bit width may be decreased. The first error threshold is greater than the second error threshold, and the quantization error of the data to be quantized may be compared with the two error thresholds at the same time. When the quantization error is greater than the first error threshold, the data bit width may be increased; when the quantization error is less than the second error threshold, the data bit width may be decreased; and when the quantization error is between the first error threshold and the second error threshold, the data bit width may remain unchanged.

In the embodiment, by comparing the quantization error with the first error threshold and the second error threshold at the same time, the data bit width may be increased or decreased according to a comparison result, and the data bit width may be adjusted more flexibly by using the first error threshold and the second error threshold, so that an adjustment result of the data bit width is more in line with the quantization requirements.

In a possible implementation, in the fine-tuning stage and/or training stage of the neural network operation, the control module may further include a first data variation range determination sub-module and a target iteration interval determination sub-module.

The first data variation range determination sub-module is configured to obtain a variation range of the data to be quantized in a current iteration and historical iterations, where the historical iterations are the iterations before the current iteration.

The target iteration interval determination sub-module is configured to, according to the variation range of the data to be quantized, determine a target iteration interval corresponding to the data to be quantized to enable the layer to be quantized to update the quantization parameter of the data to be quantized according to the target iteration interval, where the target iteration interval includes at least one iteration.

A plurality of iterations occurs during the fine-tuning stage and/or training stage of the neural network operation. Each layer to be quantized in the neural network performs a forward operation and a backward operation, and updates the weight of the layer to be quantized to complete an iteration. During the plurality of iterations, the variation range of the data to be quantized and/or the quantized data corresponding to the data to be quantized in the layer to be quantized may be used to determine whether the data to be quantized and/or the quantized data in different iterations can be quantized by using the same quantization parameter. If the variation range of the data to be quantized in the current iteration and the historical iterations is small, which, for example, is less than a set range variation threshold, the same quantization parameter may be used in a plurality of iterations with smaller variation range.

The quantization parameter corresponding to the data to be quantized may be determined by fetching a pre-stored quantization parameter. When the data to be quantized is quantized in different iterations, the quantization parameter corresponding to the data to be quantized needs to be fetched in each iteration. If the variation range of the data to be quantized and/or the variation range of the quantized data corresponding to the data to be quantized in a plurality of iterations is small, the same quantization parameter used in the plurality of iterations with small variation range may be temporarily stored. In each iteration, the temporarily stored quantization parameter may be used for quantization, instead of fetching the quantization parameter in each iteration.

The quantization parameter may be obtained by computing according to the data to be quantized and the data bit width. When the data to be quantized is quantized in different iterations, the quantization parameter needs to be computed in each iteration, respectively. If the variation range of the data to be quantized and/or the quantized data corresponding to the data to be quantized in the plurality of iterations is small, the same quantization parameter may be used in the plurality of iterations with small variation range, in which case a quantization parameter computed in a first iteration may be used directly in each iteration, instead of computing the quantization parameter in each iteration.

It should be understood that when the data to be quantized is a weight, the weight of each iteration is constantly updated. If the variation range of the weights of a plurality of iterations is small, or the variation range of the quantized data corresponding to the weights of a plurality of iterations is small, the same quantization parameter may be used to quantize the weights of the plurality of iterations.

The target iteration interval may be determined according to the variation range of the data to be quantized. The target iteration interval includes at least one iteration. The same quantization parameter may be used in each iteration within the target iteration interval, in other words, the quantization parameter of the data to be quantized may no longer be updated in each iteration within the target iteration interval. The neural network updates the quantization parameter of the data to be quantized according to the target iteration interval, the preset quantization parameter is not obtained or the quantization parameter is not computed for the iterations within the target iteration interval, in other words, the quantization parameter is not updated in the iterations within the target iteration interval. The preset quantization parameter may be obtained or the quantization parameter may be computed in the iterations outside the target iteration interval, in other words, the quantization parameter is updated in the iterations outside the target iteration interval.

It should be understood that the smaller the variation range of the data to be quantized or the quantized data of the data to be quantized in a plurality of iterations is, the higher the count of iterations within the determined target iteration interval will be. According to the computed data variation range, the target iteration interval corresponding to the computed data variation range may be determined by looking up the correspondence between a preset data variation range and an iteration interval. The correspondence between the preset data variation range and the iteration interval may be preset according to needs. According to the computed data variation range, the target iteration interval may be computed by using a set computation method. The present disclosure does not limit the computation method of the data variation range and the method of obtaining the target iteration interval.

In the embodiment, during the fine-tuning stage and/or training stage of the neural network operation, the variation range of the data to be quantized in the current iteration and historical iterations may be obtained, and the target iteration interval corresponding to the data to be quantized may be determined according to the variation range of the data to be quantized, so that the neural network may update the quantization parameter of the data to be quantized according to the target iteration interval. The target iteration interval may be determined according to the variation range of the data to be quantized or the quantized data corresponding to the data to be quantized in a plurality of iterations. The neural network may determine whether to update the quantization parameter according to the target iteration interval. Since the data variation range of a plurality of iterations within the target iteration interval is small, the quantization precision may be also guaranteed even if the quantization parameter is not updated in the iterations within the target iteration interval. The quantization parameter is not updated in a plurality of iterations within the target iteration interval, which reduces the count of fetching or computation of the quantization parameter, thereby improving the operation efficiency of the neural network.

In a possible implementation, the control module may further include a first target iteration interval application sub-module.

The first target iteration interval application sub-module is configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval.

As described in the above-mentioned embodiments of the present disclosure, the quantization parameter of the data to be quantized may be preset, or may be computed according to the data bit width corresponding to the data to be quantized. The data bit width corresponding to the data to be quantized in different layers to be quantized or the data bit width corresponding to the data to be quantized in the same layer to be quantized in different iterations may be adaptively adjusted according to the method provided in the above-mentioned embodiments of the present disclosure.

When the data bit width of the data to be quantized cannot be adjusted adaptively and is a preset data bit width, the data bit width of the data to be quantized in the iterations within the target iteration interval may be determined according to the preset data bit width of the data to be quantized in the current iteration. Each iteration within the target iteration interval may not use its own preset data bit width.

When the data bit width of the data to be quantized can be adjusted adaptively, the data bit width of the data to be quantized in the iterations within the target iteration interval may be determined according to the data bit width of the data to be quantized in the current iteration. When the data bit width can be adjusted adaptively, the data bit width may be adjusted once or many times. The data bit width of the data to be quantized after being adaptively adjusted in the current iteration may be used as the data bit width corresponding to each iteration within the target iteration interval, and the data bit width is no longer adaptively adjusted (updated) in each iteration within the target iteration interval. The data to be quantized may use the data bit width after being adaptively adjusted in the current iteration, or may use the data bit width before being adaptively adjusted, which is not limited in the present disclosure.

Since the variation range of the data to be quantized does not meet set conditions, the data bit width may be adaptively adjusted in other iterations outside of the target iteration interval according to the method provided in the present disclosure to obtain the data bit width that is more in line with the data to be quantized of the current iteration. The computation method of the target iteration interval provided in the present disclosure may also be used to compute a new target iteration interval for use, therefore, while the quantization precision of the iterations outside of the target iteration interval is ensured, the operation efficiency of the neural network is also improved.

The data bit width of each iteration within the target iteration interval is the same, and for each iteration, the corresponding quantization parameter may be computed according to the same data bit width. The quantization parameter may include at least one of a point location, a scale factor, and an offset. The quantization parameter may be computed respectively in each iteration within the target iteration interval according to the same data bit width. When the quantization parameter includes the point location (including the first-kind point location and the second-kind point location), the scale factor (including the first-kind scale factor and the second-kind scale factor), and the offset, in each iteration within the target iteration interval, the same data bit width may be used to compute the corresponding point location, scale factor and offset, respectively.

While determining the data bit width of each iteration within the target iteration interval according to the data bit width of the current iteration, the corresponding quantization parameter of each iteration within the target iteration interval may be determined according to the quantization parameter of the current iteration. The quantization parameter of each iteration within the target iteration interval may not need to be computed again based on the same data bit width, which may further improve the operation efficiency of the neural network. The corresponding quantization parameter of each iteration within the target iteration interval may be determined according to all quantization parameters or part of the quantization parameters of the current iteration. When the corresponding quantization parameter of each iteration within the target iteration interval is determined according to part of the quantization parameters of the current iteration, the remaining quantization parameters still need to be computed in each iteration within the target iteration interval.

For example, the quantization parameter includes the second-kind point location, the second-kind scale factor, and the offset. The data bit width and the second-kind point location of each iteration within the target iteration interval may be determined according to the data bit width and the second-kind point location of the current iteration. In this way, the second-kind scale factor and the offset of each iteration within the target iteration interval need to be computed based on the same data bit width. The data bit width, the second-kind point location, the second-kind scale factor, and the offset of each iteration within the target iteration interval may also be determined according to the data bit width, the second-kind point location, the second-kind scale factor, and the offset of the current iteration. In this case, the quantization parameter of each iteration within the target iteration interval does not need to be computed.

In the embodiment, according to the data bit width of the data to be quantized in the current iteration, the data bit width of the data to be quantized in the iterations within the target iteration interval may be determined to enable the neural network to determine the quantization parameter according to the data bit width of the data to be quantized in the iterations within the target iteration interval. The data bit width of each iteration within the target iteration interval may be determined according to the data bit width of the current iteration. Since the variation range of the data to be quantized in each iteration within the target iteration interval meets the set conditions, the method of computing the quantization parameter using the same data bit width may ensure the quantization precision of each iteration within the target iteration interval. Each iteration within the target iteration interval uses the same data bit width, which may also improve the operation efficiency of the neural network. In this way, a balance may be achieved between the accuracy of the operation result of the neural network after being quantized and the operation efficiency of the neural network.

In a possible implementation, the control module may further include a second target iteration application sub-module. The second target iteration interval application sub-module is configured to, according to the point location of the data to be quantized in the current iteration, determine the point location of the data to be quantized in the iterations within the target iteration interval. The point location includes the first-kind point location and/or the second-kind point location.

The first-kind point location of the data to be quantized in the iterations within the target iteration interval may be determined according to the first-kind point location of the data to be quantized in the current iteration. The second-kind point location of the data to be quantized in the iterations within the target iteration interval may be determined according to the second-kind point location of the data to be quantized in the current iteration.

Among the quantization parameters, as compared with the scale factor and the offset, different point locations may have a great impact on the quantization result of the same data to be quantized. The point location corresponding to the iterations within the target iteration interval may be determined according to the point location of the data to be quantized in the current iteration. When the data bit width cannot be adjusted adaptively, the preset point location of the data to be quantized in the current iteration may be used as the point location of the data to be quantized in each iteration within the target iteration interval; or the point location of the data to be quantized in the current iteration computed according to the preset data bit width may be used as the point location of the data to be quantized in each iteration within the target iteration interval. When the data bit width can be adjusted adaptively, the point location of the data to be quantized adjusted in the current iteration may be used as the point location of the data to be quantized in each iteration within the target iteration interval.

The point location of the data to be quantized in the iterations within the target iteration interval may be determined according to the point location of the data to be quantized in the current iteration, at the same time, the scale factor of the data to be quantized in the iterations within the target iteration interval may be determined according to the scale factor of the data to be quantized in the current iteration; and/or the offset of the data to be quantized in the iterations within the target iteration interval may be determined according to the offset of the data to be quantized in the current iteration.

The point location of the data to be quantized in the iterations within the target iteration interval may be determined according to the point location of the data to be quantized in the current iteration, at the same time, the data bit width of the data to be quantized in the iterations within the target iteration interval may be determined according to the data bit width of the data to be quantized in the current iteration, in which the data bit width of the data to be quantized in the current iteration may be a preset data bit width of the current iteration or may be a data bit width after being adaptively adjusted.

In the embodiment, the point location of the data to be quantized in the iterations within the target iteration interval may be determined according to the point location of the data to be quantized in the current iteration. The point location in each iteration within the target iteration interval may be determined according to the point location in the current iteration. Since the variation range of the data to be quantized in each iteration within the target iteration interval meets the set conditions, the method of using the same point location can ensure the quantization precision of each iteration within the target iteration interval. Using the same point location in each iteration within the target iteration interval may also improve the operation efficiency of the neural network. In this way, a balance may be achieved between the accuracy of the operation result of the neural network after being quantized and the operation efficiency of the neural network.

In a possible implementation, the first data variation range determination sub-module may include a moving average computation sub-module and a first data variation range determination sub-module. The target iteration interval determination sub-module may include a first target iteration interval determination sub-module.

The moving average computation sub-module is configured to, according to the point location of the data to be quantized in the current iteration and the point location in the historical iteration corresponding to the current iteration determined according to a historical iteration interval, compute a moving average of the point locations of the data to be quantized in the respective iteration intervals, where the point location includes the first-kind point location and/or the second-kind point location.

The first data variation range determination sub-module is configured to obtain a first data variation range according to a first moving average of the point location of the data to be quantized in the current iteration and a second moving average of the point location in an iteration corresponding to a previous iteration interval.

The first target iteration interval determination sub-module is configured to determine the target iteration interval corresponding to the data to be quantized according to the first data variation range to enable the neural network to update the quantization parameter of the data to be quantized according to the target iteration interval.

According to the first-kind point location of the data to be quantized in the current iteration and the first-kind point location in the historical iteration corresponding to the current iteration determined according to the historical iteration interval, a moving average of the first-kind point locations of the data to be quantized in the respective iteration intervals may be determined. According to the first moving average of the first-kind point location of the data to be quantized in the current iteration and the second moving average of the first-kind point location in the iteration corresponding to the previous iteration interval, the variation range of the data to be quantized may be obtained. Alternatively, according to the second-kind point location of the data to be quantized in the current iteration and the second-kind point location in the historical iteration corresponding to the current iteration determined according to the historical iteration interval, a moving average of the second-kind point locations of the data to be quantized in the respective iteration intervals may be determined. According to the first moving average of the second-kind point location of the data to be quantized in the current iteration and the second moving average of the second-kind point location in the iteration corresponding to the previous iteration interval, the variation range of the data to be quantized may be obtained.

In a possible implementation, the historical iteration corresponding to the current iteration determined according to the historical iteration interval may be a historical iteration for computing the target iteration interval. The correspondence between the current iteration and the corresponding target iteration interval may include the following.

The target iteration interval may be computed from the current iteration, and the target iteration interval may be recomputed from a next iteration after the target iteration interval corresponding to the current iteration ends. For example, the current iteration is the 100-th iteration, and the target iteration interval is 3, then the iterations within the target iteration interval include the 100-th iteration, the 101-th iteration, and the 102-th iteration; the target iteration interval corresponding to the 103-th iteration may be computed in the 103-th iteration, and the first iteration within the target iteration interval may be computed from the 103-th iteration. At this time, the current iteration is the 103-th iteration, and the historical iteration corresponding to the current iteration determined according to the historical iteration interval is the 100-th iteration.

The target iteration interval may be counted from the next iteration after the current iteration, and the target iteration interval may be recomputed from the last iteration within the target iteration interval. For example, the current iteration is the 100-th iteration, and the target iteration interval is 3, then the iterations within the target iteration interval include the 101-th iteration, the 102-th iteration, and the 103-th iteration; the target iteration interval corresponding to the 103-th iteration may be computed in the 103-th iteration, and the first iteration within the target iteration interval may be computed from the 104-th iteration. At this time, the current iteration is the 103-th iteration, and the historical iteration corresponding to the current iteration determined according to the historical iteration interval is the 100-th iteration.

The target iteration interval may be counted from a next iteration after the current iteration, and the target iteration interval may be recomputed from the next iteration after the target iteration interval ends. For example, the current iteration is the 100-th iteration, and the target iteration interval is 3, then the iterations within the target iteration interval include the 101-th iteration, the 102-th iteration, and the 103-th iteration; the target iteration interval corresponding to the 104-th iteration may be computed in the 104-th iteration, and the first iteration within the target iteration interval may be computed from the 105-th iteration. At this time, the current iteration is the 104-th iteration, and the historical iteration corresponding to the current iteration determined according to the historical iteration interval is the 100-th iteration.

Other correspondences between the current iteration and the target iteration interval may be determined according to requirements. For example, the target iteration interval may be counted from an N-th iteration after the current iteration, where N is greater than 1. This is not limited in the present disclosure.

It should be understood that the computed moving average of the point locations of the data to be quantized, corresponding to the respective iteration intervals, may include the first moving average of the point location of the data to be quantized in the current iteration and the second moving average of the point location of the data to be quantized in the iteration corresponding to the previous iteration interval. The first moving average ma) of the point location corresponding to the current iteration may be computed based on the formula (27):

$$m^{(t)} \leftarrow \alpha \times s^{(t)} + (1-\alpha) \times m^{(t-1)} \qquad \text{Formula (27)}$$

In this formula, t is the current iteration; t−1 is the historical iteration determined according to the previous iteration interval; $m^{(t-1)}$ is the second moving average of the historical iteration determined according to the previous iteration interval; $s^{(t)}$ is the point location of the current iteration, which may be the first-kind point location or the second-kind point location; $\alpha$ is a first parameter, which may be a hyper-parameter.

In the embodiment, the moving average of the point locations of the data to be quantized in the respective iteration intervals may be computed according to the point location of the data to be quantized in the current iteration and the point location of the data to be quantized in the historical iteration corresponding to the current iteration determined according to the historical iteration interval; and the first data variation range may be obtained according to the first moving average of the point location of the data to be quantized in the current iteration and the second moving average of the point location in the iteration corresponding to the previous iteration interval. The target iteration interval corresponding to the data to be quantized may be determined according to the first data variation range to enable the neural network to update the quantization parameter of the data to be quantized according to the target iteration interval. Since the first data variation range may be used to indicate the variation trend of the point location, the target iteration interval may vary with the variation trend of the point location of the data to be quantized, and the size of each computed target iteration interval may also vary with the variation trend of the point location of the data to be quantized. Since the quantization parameter is determined according to the target iteration interval, the quantized data obtained according to the quantization parameter may be more in line with the variation trend of the point location of the data to be quantized. This may improve the operation efficiency of the neural network while ensuring quantization precision.

In a possible implementation, the first data variation range determination sub-module may include a first range determination sub-module. The first range determination sub-module is configured to compute the difference between the first moving average and the second moving average, and to determine the absolute value of the difference which becomes the first data variation range.

The first data variation range $\text{diff}_{update1}$ may be computed based on the formula (28):

$$\text{diff}_{update1} = |m^{(t)} - m^{(t-1)}| = \alpha|s^{(t)} - m^{(t-1)}| \qquad \text{Formula (28)}$$

The target iteration interval corresponding to the data to be quantized may be determined according to the first data variation range to enable the neural network to update the quantization parameter of the data to be quantized according to the target iteration interval. The target iteration interval I may be computed based on the formula (29).

$$I = \frac{\beta}{\text{diff}_{update1}} - \gamma \qquad \text{Formula (29)}$$

In this formula, $\beta$ is a second parameter, and $\gamma$ is a third parameter. The second parameter and the third parameter may be hyper-parameters.

It should be understood that the first data variation range may be used to indicate the variation trend of the point location. The greater the first data variation range is, the larger the variation range of the quantized data will be. In this case, when the quantization parameter is updated, a shorter target iteration interval I is required.

In the embodiment, the difference between the first moving average and the second moving average may be computed, and the absolute value of the difference may be determined as the first data variation range. An accurate first data variation range may be obtained according to the difference between the moving averages.

In a possible implementation, the control module may further include a second data variation range determination sub-module, and the target iteration interval determination sub-module may include a second target iteration interval determination sub-module.

The second data variation range determination sub-module is configured to obtain a second data variation range according to the data to be quantized and the quantized data corresponding to the data to be quantized in the current iteration.

The second target iteration interval determination sub-module is configured to determine the target iteration interval corresponding to the data to be quantized according to the first data variation range and the second data variation range of the data to be quantized thus enabling the neural network to update the quantization parameter of the data to be quantized according to the target iteration interval.

The second data variation range may be obtained according to the data to be quantized and the quantized data corresponding to the data to be quantized in the current iteration. The second data variation range may also be obtained according to the data to be quantized and the de-quantized data corresponding to the data to be quantized in the current iteration.

Similarly, the second data variation range $\text{diff}_{bit}$ of the data to be quantized and the de-quantized data corresponding to the data to be quantized in the current iteration may be computed based on the formula (30). The second data variation range $\text{diff}_{bit}$ of the data to be quantized and the de-quantized data corresponding to the data to be quantized may be also computed based on another error computation method. This is not limited in the present disclosure.

$$\text{diff}_{bit} = \log_2\left(\frac{\sum_i |z_i^{(n)}| - \sum_i |z_i|}{\sum_i |z_i|} + 1\right) \qquad \text{Formula (30)}$$

In this formula, $z_i$ is the data to be quantized, and $z_i^{(n)}$ is the de-quantized data corresponding to the data to be quantized. It should be understood that the second data variation range may be used to indicate the variation trend of the data bit width of the data to be quantized. The greater the second data variation range is, the more likely the data to be quantized needs to update the corresponding data bit width, and a shorter iteration is needed for updating. The greater the second data variation range is, the smaller the target iteration interval required will be.

In the embodiment, the second data variation range may be obtained according to the data to be quantized and the quantized data corresponding to the data to be quantized in the current iteration. The target iteration interval corresponding to the data to be quantized may be determined according to the first data variation range and the second data variation range of the data to be quantized to enable the neural network to update the quantization parameter of the data to be quantized according to the target iteration interval. Since the second data variation range may be used to indicate the variation requirements of the data bit width, the target iteration interval obtained by computation according to the first data variation range and the second data variation range may track the variation of the point location and the data bit width at the same time. In this way, the target iteration interval may better meet the data quantization requirements of the data to be quantized.

In a possible implementation, obtaining the second data variation range according to the data to be quantized and the quantized data corresponding to the data to be quantized in the current iteration may include:

computing an error between the data to be quantized and the quantized data corresponding to the data to be quantized in the current iteration; and determining the square of the error, which is then taken as the second data variation range.

The second data variation range $\text{diff}_{update2}$ may be computed based on the formula (31):

$$\text{diff}_{update2} = \delta * \text{diff}_{bit}^2 \qquad \text{Formula (31)}$$

In this formula, $\delta$ is a fourth parameter which may be a hyper-parameter.

It should be understood that different quantization parameters may be obtained according to different data bit widths, resulting in different quantized data. In this case, different second data variation ranges may be generated. The second data variation range may be used to indicate the variation trend of the data bit width. The greater the second data variation range is, the shorter the target iteration interval required will be to update the data bit width frequently. In other words, the target iteration interval will need to be smaller.

In a possible implementation, the second target iteration interval determination sub-module may include an interval determination sub-module.

The interval determination sub-module is configured to determine the target iteration interval corresponding to the data to be quantized according to a maximum value of the first data variation range and the second data variation range.

The target iteration interval may be computed based on the formula (32), $$I = \frac{\beta}{\max(\text{diff}_{update1}, \text{diff}_{update2})} - \gamma \qquad \text{Formula (32)}$$

In this formula, $\beta$ is a second parameter, and $\gamma$ is a third parameter. The second parameter and the third parameter may be hyper-parameters.

It should be understood that the variation trend of the data bit width and the point location may be indicated at the same time according to the target iteration interval obtained by using the first data variation range and the second data variation range. When the variation trend of one of the first data variation range and the second data variation range is greater, the target iteration interval may vary accordingly. The target iteration interval may track the variation of the data bit width and the point location at the same time and make corresponding adjustments, so that the quantization parameter updated according to the target iteration interval may be more in line with the variation trend of the target data, and then the quantized data obtained according to the quantization parameter may better meet the quantization requirements.

In a possible implementation, the first data variation range determination sub-module may include a second data variation range determination sub-module. The second data variation range determination sub-module is configured to, when the current iteration is outside of an update period, obtain the data variation range of the data to be quantized in the current iteration and the historical iterations, in which the update period includes at least one iteration.

In the training process and/or fine-tuning process of the neural network operation, the data to be quantized varies greatly in a plurality of iterations at the beginning of training or fine-tuning. If the target iteration interval is computed in the plurality of iterations at the beginning of training or fine-tuning process, the computed target iteration interval may lose its usefulness. According to a preset update period, the target iteration interval is not computed in each iteration within the update period, the target iteration interval is not applicable, a plurality of iterations may use the same data bit width or point location.

When the iteration goes outside of the update period, in other words, when the current iteration is outside of the update period, the data variation range of the data to be quantized in the current iteration and the historical iterations may be obtained; and the target iteration interval corresponding to the data to be quantized may be determined according to the variation range of the data to be quantized to enable the neural network to update the quantization parameter of the data to be quantized according to the target iteration interval. For example, if a preset update period is 100 iterations, then the target iteration interval is not computed from the first iteration to the 100-th iteration. When the iteration goes to the 101-th iteration, in other words, when the current iteration is the 101-th iteration, the current iteration is outside of the update period, at this time, the target iteration interval corresponding to the data to be quantized in the 101-th iteration may be determined according to the variation range of the data to be quantized in the 101-th iteration and iterations from the first iteration to the 100-th iteration, and the computed target iteration interval may be used in the 101-th iteration or an iteration at an interval of a preset count of iterations from the 101-th iteration.

The update period may be counted from the preset count of iterations. For example, a plurality of iterations in the update period may be counted starting from the first iteration, or a plurality of iterations in the update period may be counted starting from the N-th iteration. This is not limited in the present disclosure.

In the embodiment, when an iteration goes outside of the update period, the target iteration interval may be computed and used, which may avoid the problem that the target iteration interval is of little significance due to the greater variation of the data to be quantized in the early stage of the training process or fine-tuning process of the neural network operation, and the operation efficiency of the neural network may be further improved when the target iteration interval is used.

In a possible implementation, the control module may further include a period interval determination sub-module, a first period interval application sub-module, and a second period interval application sub-module.

The period interval determination sub-module is configured to, when the current iteration is within a preset period, determine a period interval according to the current iteration, an iteration corresponding to the current iteration in a next period after the preset period, and an iteration interval corresponding to the current iteration.

The first period interval application sub-module configured to determine the data bit width of the data to be quantized in an iteration within the period interval according to the data bit width of the data to be quantized corresponding to the current iteration.

Alternatively, the second period interval application sub-module is configured to determine the point location of the data to be quantized in the iteration within the period interval according to the point location of the data to be quantized corresponding to the current iteration.

There are a plurality of periods in the training process or fine-tuning process of the neural network operation in which each period may include a plurality of iterations. The process through which data used for the neural network operation is completely computed once is referred to as a period. During the training process, as the iteration progresses, the weights of the neural network tend to be stablize. After the training is stable, the data to be quantized—such as the neuron, weight, bias and gradient—may tend to be stable. When the data to be quantized tends to be stable, the data bit width and quantization parameter of the data to be quantized also tend to be stable. Similarly, in the fine-tuning process, after the fine-tuning is stable, the data bit width and quantization parameter of the data to be quantized also tend to be stable.

Therefore, a preset period may be determined according to a period in which the training is stable or the fine-tuning is stable. For example, the period after the period in which the training is stable or the fine-tuning is stable may be determined as the preset period. In other words, if the training is stable in the M-th period, the period after the M-th period may be determined as the preset period. In the preset period, a target iteration interval may be computed every other period, and the data bit width or the quantization parameter may be adjusted once according to the computed target iteration interval to reduce the update times of the data bit width or the quantization parameter and improve the operation efficiency of the neural network.

For example, the preset period is determined to be the period after the M-th period. In the M+1-th period, the target iteration interval computed according to the P-th iteration in the M-th period ends at the Q-th iteration in the M+1-th period, and the corresponding target iteration interval $I_{m+1}$ is computed according to the $Q_{m+1}$-th iteration in the M+1-th period. In the M+2-th period, the iteration corresponding to the $Q_{m+1}$-th iteration in the M+1-th period is the $Q_{m+2}$-th iteration. The period interval starts from the $Q_{m+1}$-th iteration in the M+1-th period and ends at the $Q_{m+2}+I_{m+1}$-th iteration in the M+2-th period. In each iteration within the period interval, quantization parameters such as the data bit width or point location determined according to the $Q_{m+1}$-th iteration in the M+1-th period may be used.

In the embodiment, the period interval may be set. After the training or fine-tuning stage of the neural network operation is stable, the quantization parameters such as the data bit width or the point location may be updated every period according to the period interval. After the training or fine-tuning stage is stable, reducing the update times of the data bit width or the point location according to the period interval may improve the operation efficiency of the neural network while ensuring the quantization precision.

It should be understood that the foregoing device embodiments are only illustrative, and the device of the present disclosure may also be implemented in other ways. For example, the division of the units/modules in the foregoing embodiment is only a logical function division, and there may be other division methods in actual implementation. For example, a plurality of units, modules, or components may be combined or integrated into another system, or some features may be omitted or not implemented.

In addition, unless otherwise specified, the functional units/modules in the various embodiments of the present disclosure may be integrated into one unit/module. Alternatively, each unit/module may exist alone physically. Alternatively, two or more units/modules may be integrated together. The above-mentioned integrated units/modules can be implemented in the form of hardware or in the form of software program modules.

When the above-mentioned integrated units/modules are implemented in the form of hardware, the hardware may be a digital circuit, an analog circuit, and the like. Physical implementation of the hardware structure may include, but is not limited to, a transistor, a memristor, and the like. Unless otherwise specified, the artificial intelligence processor may be any appropriate hardware processor, such as a CPU, a GPU, an FPGA, a DSP, an ASIC, and the like. Unless otherwise specified, the storage unit may be any suitable magnetic storage medium or magneto-optical storage medium, such as an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If the integrated units/modules are implemented in the form of software program modules and sold or used as an independent product, the product can be stored in a computer-readable memory. Based on such understanding, the essence of the technical solutions of the present disclosure, or a part of the present disclosure that contributes to the prior art, or all or part of the technical solutions, can be all or partly embodied in the form of a software product that is stored in memory. The software product may include several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

FIG. 4 is a flow chart of a neural network quantization method according to an embodiment of the present disclosure. As shown in FIG. 4, the method may be applied to a neural network quantization device which includes a control module and a processing module. The processing module includes a first operation sub-module consisting of a main operation sub-module and a secondary operation sub-module. The method may include step S11 and step S12.

In step S11, the control module is used to determine a plurality of pieces of data to be quantized from the target data of the neural network, and obtain a quantization result from the target data according to a piece of quantized data corresponding to each piece of data to be quantized. The piece of quantized data corresponding to each piece of data to be quantized is obtained by quantizing the piece of data to be quantized by using a corresponding quantization parameter. The quantization parameter includes a point location.

In step S12, the first operation sub-module is used to perform an operation related to the quantization result to obtain the operation result. Step S12 may include:
  sending, by the main operation sub-module, first data to the secondary operation sub-module, where the first data includes first-style data, which is in the quantization result, obtained by quantizing according to the point location;
  performing, by the secondary operation sub-module, multiplication on the received first data to obtain an intermediate result;
  performing, by the main operation sub-module, an operation on data except for the first data in the intermediate result and the quantization result to obtain the operation result.

In a possible implementation, the quantization parameter may also include an offset and or a scale factor. The quantization result may also include second-style data. The second-style data includes data represented by the point location, and data represented by the offset and/or the scale factor. The first data may also include the point location data of the second-style data in the quantization result.

In a possible implementation, the device may further include a data conversion sub-module. In this case, the method would further include:
  converting, by the data conversion sub-module, the format of data to be converted to obtain converted data, wherein format styles of the converted data include any one of a first style and a second style, the data to be converted includes data that is not subjected to quantization in the target data, and the first data also includes first-style converted data and/or point location data of the second-style converted data, wherein
  performing, by the main operation sub-module, an operation on data except for the first data in the intermediate result and the quantization result to obtain the operation result includes:
  performing, by the main operation sub-module, an operation on the intermediate result, the data except for the first data in the intermediate result, and the data except for the first data in the converted data to obtain the operation result.

In a possible implementation, the method may further include:
  converting, by the data conversion sub-module, the format of the quantization result of the target data which is as of yet unconverted, initially obtained according to the quantized data corresponding to the respective data to be quantized.

In a possible implementation, each piece of data to be quantized is a subset of the target data. The target data is any kind of data to be operated on and quantized in the layer to be quantized of the neural network, where the data to be operated on includes at least one of an input neuron, a weight, a bias, and a gradient.

In a possible implementation, determining, by the control module, a plurality of pieces of data to be quantized from the target data of the neural network may include:
  determining the target data in one or more layers to be quantized as one piece of data to be quantized;
  determining the same kind of data to be operated in one or more layers to be quantized as one piece of data to be quantized;
  determining the data in one or more channels in the target data of the corresponding layer to be quantized as one piece of data to be quantized;
  determining one or more batches of data in the target data of the corresponding layer to be quantized as one piece of data to be quantized; and
  dividing the target data in the corresponding layer to be quantized into one or more pieces of data to be quantized according to a determined division size.

In a possible implementation, the processing module may further include a second operation sub-module. In this case, the method may further include:
  performing, by the second operation sub-module, some processing operation that is not the processing operation performed by the first operation sub-module in the device.

In a possible implementation, the method may further include:
  computing the corresponding quantization parameter according to each piece of data to be quantized and the corresponding data bit width.

In a possible implementation, computing the corresponding quantization parameter according to each piece of data to be quantized and the corresponding data bit width may include:
  obtaining a first-kind point location of each piece of data to be quantized according to the maximum value of the absolute value of each piece of data to be quantized and the corresponding data bit width, when the quantization parameter does not include the offset.

In a possible implementation, computing the corresponding quantization parameter according to each piece of data to be quantized and the corresponding data bit width may include:
  obtaining the maximum value of the piece of quantized data according to each piece of data to be quantized and the corresponding data bit width, when the quantization parameter does not include the offset; and
  obtaining a first-kind scale factor of each piece of data to be quantized according to the maximum value of the absolute value of each piece of data to be quantized and the maximum value of the piece of quantized data, when the quantization parameter includes the offset.

In a possible implementation, computing the corresponding quantization parameter according to each piece of data to be quantized and the corresponding data bit width may include:
  obtaining a second-kind point location of each piece of data to be quantized according to the maximum value and the minimum value of each piece of data to be quantized and the corresponding data bit width, when the quantization parameter includes an offset.

In a possible implementation, computing the corresponding quantization parameter according to each piece of data to be quantized and the corresponding data bit width may include:

obtaining a maximum value of the piece of quantized data according to each piece of data to be quantized and the corresponding data bit width, when the quantization parameter includes the offset; and obtaining a second-kind scale factor of each piece of data to be quantized according to the maximum value and the minimum value of each piece of data to be quantized as well as the maximum value of the piece of quantized data, when the quantization parameter includes the offset.

In a possible implementation, computing the corresponding quantization parameter according to each piece of data to be quantized and the corresponding data bit width may include:

obtaining the offset of each piece of data to be quantized according to the maximum value and the minimum value in each piece of data to be quantized.

In a possible implementation, the method may further include:

determining a quantization error corresponding to each piece of data to be quantized according to each piece of data to be quantized and the piece of quantized data corresponding to each piece of data to be quantized, adjusting the data bit width corresponding to each piece of data to be quantized to obtain an adjusted bit width corresponding to each piece of data to be quantized according to the quantization error and an error threshold corresponding to each piece of data to be quantized, and updating the data bit width corresponding to each piece of data to be quantized to the corresponding adjusted bit width, and computing a corresponding adjusted quantization parameter according to each piece of data to be quantized and the corresponding adjusted bit width to quantize each piece of data to be quantized with.

In a possible implementation, adjusting the data bit width corresponding to each piece of data to be quantized to obtain the adjusted bit width corresponding to each piece of data to be quantized according to the quantization error and the error threshold corresponding to each piece of data to be quantized may include:

increasing the corresponding data bit width to obtain the corresponding adjusted bit width, when the quantization error is greater than a first error threshold.

In a possible implementation, the method may further include:

computing an adjusted quantization error for each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold.

In a possible implementation, adjusting the data bit width corresponding to each piece of data to be quantized to obtain the adjusted bit width corresponding to each piece of data to be quantized according to the quantization error and the error threshold corresponding to each piece of data to be quantized may include:

increasing the corresponding data bit width to obtain the corresponding adjusted bit width, where the second error threshold is less than the first error threshold, when the quantization error is less than a second error threshold.

In a possible implementation, the method may further include:

computing an adjusted quantization error for each piece of data to be quantized according to the adjusted bit width and the piece of data to be quantized, and continuing to decrease the adjusted bit width according to the adjusted quantization error and the second error threshold until the adjusted quantization error obtained according to the adjusted bit width and the piece of data to be quantized is greater than or equal to the second error threshold.

In a possible implementation, during a fine-tuning stage and/or training stage of a neural network operation, the method may further include:

obtaining a variation range of data to be quantized in a current iteration and historical iterations, where the historical iterations are iterations before the current iteration, and determining a target iteration interval according to the variation range of the data to be quantized and corresponding to the data to be quantized, thus enabling the layer to be quantized to update the quantization parameter of the data to be quantized in accordance with it, where the target iteration interval includes at least one iteration.

In a possible implementation, the method may further include:

determining a data bit width of the data to be quantized in iterations within the target iteration interval according to a data bit width of the data to be quantized in the current iteration, thus enabling the neural network to determine a quantization parameter according to the data bit width of the data to be quantized in the iterations within the target iteration interval.

In a possible implementation, the method may further include:

determining a point location of the data to be quantized in the iterations within the target iteration interval according to a point location of the data to be quantized in the current iteration, wherein the point location includes a first-kind point location and/or a second-kind point location.

In a possible implementation, obtaining the variation range of the data to be quantized in the current iteration and historical iterations may include:

according to the point location of the data to be quantized in the current iteration and the point location in a historical iteration corresponding to the current iteration determined according to a historical iteration interval, computing a moving average of the point locations of the data to be quantized in the respective iteration intervals, where the point locations include the first-kind point location and/or the second-kind point location; and obtaining a first data variation range according to a first moving average of the point location of the data to be quantized in the current iteration and a second moving average of the point location in an iteration corresponding to a previous iteration interval.

Determining the target iteration interval corresponding to the data to be quantized according to the variation range of the data to be quantized to enable the layer to be quantized to update the quantization parameter of the data to be quantized according to the target iteration interval may include:

determining the target iteration interval corresponding to the data to be quantized according to the first data variation range, thus enabling the neural network to update the quantization parameter of the data to be quantized according to the target iteration interval.

In a possible implementation, obtaining the variation range of the data to be quantized in the current iteration and the historical iterations may include:
computing a difference between the first moving average and the second moving average, and
determining an absolute value of the difference as the first data variation range.

In a possible implementation, the method may further include:
obtaining a second data variation range according to the data to be quantized and the quantized data corresponding to the data to be quantized in the current iteration.

Determining the target iteration interval corresponding to the data to be quantized according to the variation range of the data to be quantized to enable the layer be quantized to update the quantization parameter of the data to be quantized according to the target iteration interval may include:
determining the target iteration interval corresponding to the data to be quantized according to the first data variation range and the second data variation range of the data to be quantized, thus enabling the neural network to update the quantization parameter of the data to be quantized according to the target iteration interval.

In a possible implementation, obtaining the second data variation range according to the data to be quantized and the quantized data corresponding to the data to be quantized in the current iteration may include:
computing an error between the data to be quantized and the quantized data corresponding to the data to be quantized in the current iteration, and
determining the square of the error as the second data variation range.

In a possible implementation, determining the target iteration interval corresponding to the data to be quantized according to the first data variation range and the second data variation range of the data to be quantized may include:
determining the target iteration interval corresponding to the data to be quantized according to the maximum value of the first data variation range and the second data variation range.

In a possible implementation, obtaining the variation range of the data to be quantized in the current iteration and the historical iterations may include:
obtaining the data variation range of the data to be quantized in the current iteration and the historical iterations when the current iteration is outside of an update period, where the update period includes at least one iteration.

In a possible implementation, the method may further include:
determining a period interval when the current iteration is within a preset period according to the current iteration, an iteration corresponding to the current iteration in a next period after the preset period, and an iteration interval corresponding to the current iteration;
determining the data bit width of the data to be quantized in an iteration within the period interval according to the data bit width of the data to be quantized in the current iteration; or
determining the point location of the data to be quantized in the iteration within the period interval according to the point location of the data to be quantized in the current iteration.

According to the neural network quantization method provided in the embodiments of the present disclosure, a plurality of pieces of data to be quantized in the target data may be separately quantized according to a corresponding quantization parameter. An operation related to the quantization result is performed by the first operation sub-module, which may reduce the storage space of the data while ensuring the precision, accuracy, and reliability of the operation result and improving the operation efficiency. In addition, performing quantization may also reduce the size of the neural network model and reduce the performance requirements of a terminal running the neural network model, so that the neural network model may be applied to terminals such as mobile phones with relatively limited size, computing power, and electrical power provision.

It should be noted that the foregoing embodiments of method, for the sake of conciseness, are all described as a series of combinations of actions, but those skilled in the art should know that the present disclosure is not limited by the described order of actions since the steps may be performed in a different order or simultaneously according to the present disclosure. Secondly, those skilled in the art should also understand that the embodiments described in the specification are all optional, and the actions and modules involved are not necessarily required for this disclosure.

Further, it should be explained that though the steps in the flowchart FIG. 4 are shown by following the direction of arrows, these steps may not necessarily be performed according to the order indicated by the arrows. Unless clearly stated herein, the order for performing these steps is not strictly restricted. These steps may be performed in a different order. Additionally, at least part of the steps shown in FIG. 4 may include a plurality of sub-steps or a plurality of stages. These sub-steps or stages may not necessarily be performed and completed at the same time, instead, these sub-steps or stages may be performed at different times. These sub-steps or stages may not necessarily be performed sequentially either; instead, these sub-steps or stages may be performed in turn or alternately with parts of other steps, or sub-steps of other steps, or stages.

An aspect of the present disclosure provides a non-transitory computer readable storage medium where computer program instructions are stored. When the computer program instructions are executed by a processor, the neural network quantization method is realized.

A possible implementation provides an artificial intelligence chip including the above-mentioned data processing device.

A possible implementation provides a board card including a storage component, an interface device, a control component, and the above-mentioned artificial intelligence chip. The artificial intelligence chip is connected to the storage component, the control component, and the interface device, respectively; the storage component is configured to store data; the interface device is configured to implement data transfer between the artificial intelligence chip and external equipment; and the control component is configured to monitor the state of the artificial intelligence chip.

Figure 5:
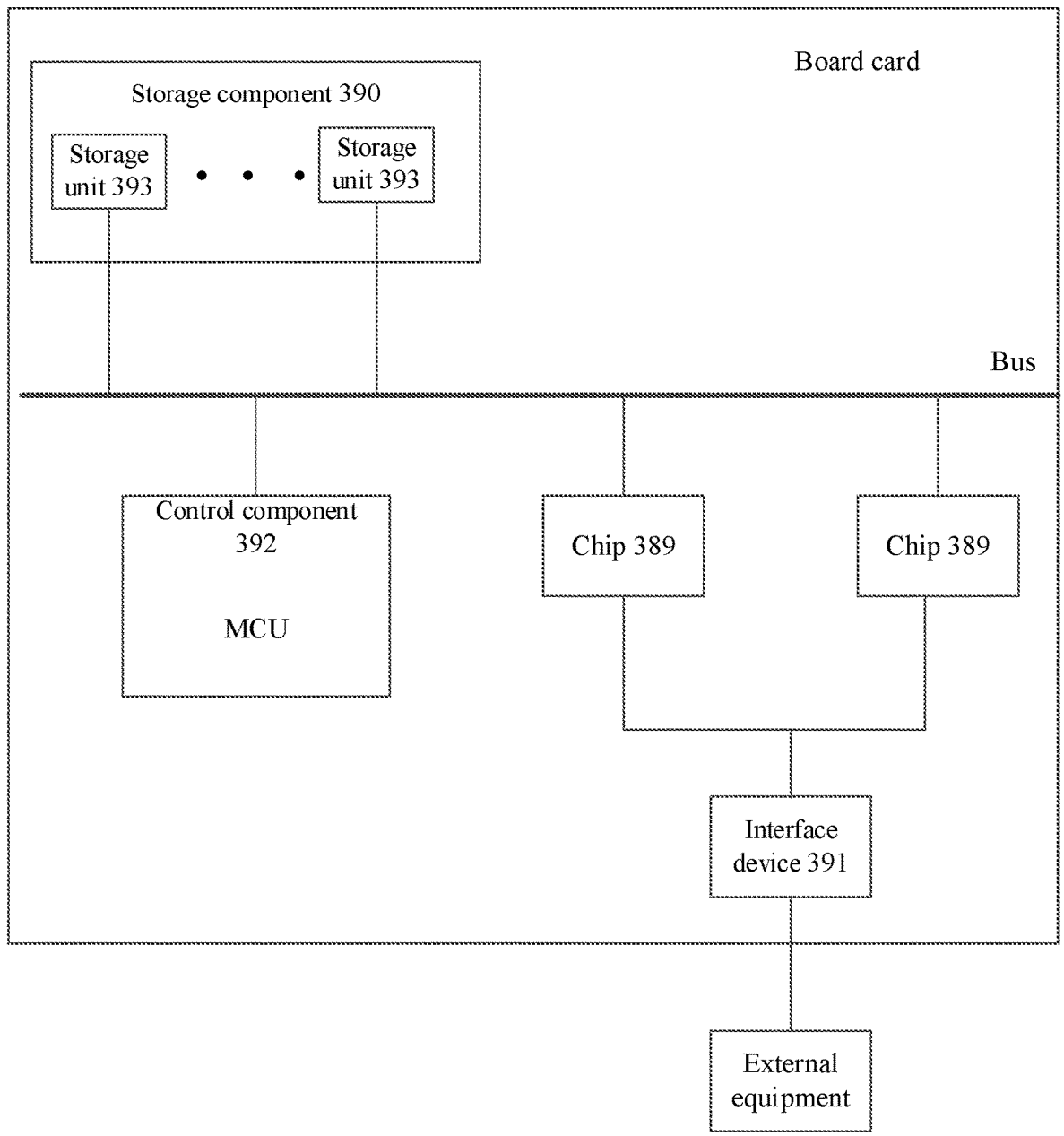
FIG. 5 is a block diagram of a board card according to an embodiment of the present disclosure.

FIG. 5 shows a block diagram of a board card according to an embodiment of the present disclosure. Referring to FIG. 5, in addition to the above-mentioned chip 389, the board card may further include other matching components. The matching components may include, but are not limited to, a storage component 390, an interface device 391, and a control component 392.

The storage component 390 is connected to the artificial intelligence chip through a bus, and is configured to store data. The storage component may include a plurality of groups of storage units 393. Each group of storage units is connected to the artificial intelligence chip through the bus. It can be understood that each group of storage units may be a DDR SDRAM (Double Data Rate Synchronous Dynamic Random Access Memory).

The storage unit 102 in the processor 100 may include one group or a plurality of groups of storage units 393. When the storage unit 102 includes a group of storage units 393, a plurality of processing units 101 share the storage units 393 for data storage. When the storage unit 102 includes a plurality of groups of storage units 393, a dedicated group of storage units 393 may be provided for each processing unit 101, and a group of shared storage units 393 may be provided for some or all of the plurality of processing units 101.

DDR can double the speed of SDRAM without increasing the clock frequency. DDR allows data to be read on the rising and falling edges of the clock pulse. The speed of DDR is twice the speed of a standard SDRAM. In an embodiment, the memory device may include 4 groups of storage units. Each group of storage units may include a plurality of DDR4 particles (chips). In an embodiment, four 72-bit DDR4 controllers may be arranged inside the artificial intelligence chip, where 64 bits of each 72-bit DDR4 controller are for data transfer and 8 bits are for ECC parity. It can be understood that when each group of storage units adopts DDR4-3200 particles, the theoretical bandwidth of data transfer may reach 25600 MB/s.

In an embodiment, each group of storage units may include a plurality of DDR SDRAMs arranged in parallel. DDR can transfer data twice per clock cycle. A DDR controller may be arranged inside the chip for controlling the data transfer and data storage of each storage unit.

The interface device may be electrically connected to the artificial intelligence chip. The interface device is configured to realize data transfer between the artificial intelligence chip and external equipment (such as a server or a computer). In an embodiment, the interface device may be a standard PCIe interface. For instance, data to be processed may be transferred by a server through the standard PCIe interface to the chip, thereby realizing data transfer. Optionally, when a PCIe 3.0×16 interface is adopted for transferring data, the theoretical bandwidth may reach 16000 MB/s. In another embodiment, the interface device may also be another interface. The present disclosure does not restrict the other interface to a specific form, as long as the interface unit can realize the transferring function. In addition, a computation result from the artificial intelligence chip may still be transferred by the interface device to external equipment (such as a server).

The control component is electrically connected to the artificial intelligence chip. The control component is configured to monitor the state of the artificial intelligence chip. Specifically, the artificial intelligence chip and the control component can be electrically connected through an SPI interface. The control component may include an MCU (Micro Controller Unit). If the artificial intelligence chip includes a plurality of processing chips, a plurality of processing cores, or a plurality of processing circuits, the chip is capable of driving a plurality of loads. In this case, the artificial intelligence chip can be in different working states such as multi-load state and light-load state. The working state of a plurality of processing chips, a plurality of processing cores, and/or a plurality of processing circuits can be regulated and controlled by the control device.

In a possible implementation, electronic equipment is provided. The electronic equipment includes the artificial intelligence chip. The electronic equipment includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage device, a wearable device, a vehicle, a household appliance, and/or a medical device. Vehicles include an airplane, a ship, and/or a car; Household electrical appliances may include a television, an air conditioner, a microwave oven, a refrigerator, an electric rice cooker, a humidifier, a washing machine, an electric lamp, a gas cooker, and a range hood; and medical equipment may include a nuclear magnetic resonance spectrometer, a B-ultrasonic scanner, and/or an electrocardiograph.

In the embodiments above, the description of each embodiment has its own emphasis. For a part that is not described in detail in one embodiment, reference may be made to related descriptions in other embodiments. Each technical feature of the embodiments above can be randomly combined. For conciseness, not all possible combinations of the technical features of the embodiments above are described. Yet, provided that there is no contradiction, combinations of these technical features fall within the scope of the description of the present specification.

The foregoing can be better understood according to the following articles:

Article A1. A neural network quantization device comprising a control module and a processing module, wherein the processing module includes a first operation sub-module which includes a main operation sub-module and a secondary operation sub-module;

the control module is configured to determine a plurality pieces of data to be quantized from target data of the neural network, and obtain a quantization result of the target data according to a piece of quantized data corresponding to each piece of data to be quantized, wherein the piece of quantized data corresponding to each piece of data to be quantized is obtained by quantizing the piece of data to be quantized by using a corresponding quantization parameter, wherein the quantization parameter includes a point location;

the first operation sub-module is configured to perform an operation related to the quantization result to obtain an operation result, wherein the main operation sub-module is configured to send first data to the secondary operation sub-module, wherein the first data includes first-style data, which is in the quantization result, obtained by quantizing according to the point location;

the secondary operation sub-module is configured to perform multiplication on the received first data to obtain an intermediate result; and the main operation sub-module is also configured to perform an operation on data except for the first data in the intermediate result and the quantization result to obtain an operation result.

Article A2. The neural network quantization device of article A1, wherein the quantization parameter includes an offset and/or a scale factor, and the quantization result further includes second-style data, wherein the second-style data includes data of a first part represented by the point location, and data of a second part represented by the offset and/or the scale factor; and the first data also includes a first part of the second-style data in the quantization result.

Article A3. The neural network quantization device of article A1, wherein the processing module also includes:
- a data conversion sub-module configured to convert a format of data to be converted to obtain converted data, wherein format styles of the converted data include any one of a first style and a second style, wherein the data to be converted includes data that is not subjected to quantization in the target data, and the first data further includes first-style converted data and/or a first part of second-style converted data; and
- the main operation sub-module also configured to perform an operation on the intermediate result, the data except for the first data in the intermediate result, and the data except for the first data in the converted data to obtain an operation result.

Article A4. The neural network quantization device of article A3, wherein
- the data conversion sub-module is also configured to convert a format of the quantization result to be converted of the target data which is obtained according to the piece of quantized data corresponding to the respective data to be quantized to obtain the quantization result.

Article A5. The neural network quantization device of any one of Articles A1 to A4, wherein each piece of data to be quantized is a subset of the target data, wherein the target data is any kind of data to be operated and to be quantized in a layer to be quantized of the neural network, and the data to be operated includes at least one of an input neuron, a weight, a bias, and a gradient.

Article A6. The neural network quantization device of article A5, wherein the control module determines a plurality pieces of data to be quantized by adopting at least one of:
- determining the target data in one or more layers to be quantized as one piece of data to be quantized;
- determining the same kind of data to be operated in one or more layers to be quantized as one piece of data to be quantized;
- determining the data in one or more channels in the target data of a corresponding layer to be quantized as one piece of data to be quantized;
- determining one or more batches of data in the target data of the corresponding layer to be quantized as one piece of data to be quantized; and
- dividing the target data in the corresponding layer to be quantized into one or more pieces of data to be quantized according to a determined division size.

Article A7. The neural network quantization device of article A1, wherein the processing module also includes:
- a second operation sub-module configured to perform an operation processing except for the operation processing in the device performed by the first operation sub-module.

Article A8. The neural network quantization device of article A1 or A2, wherein the control module includes:
- a parameter determination sub-module configured to compute a corresponding quantization parameter according to each piece of data to be quantized and a corresponding data bit width.

Article A9. The neural network quantization device of article A8, wherein the parameter determination sub-module includes:
- a first point location determination sub-module configured to, when the quantization parameter does not include the offset, obtain a first-kind point location of each piece of data to be quantized according to a maximum value of an absolute value of each piece of data to be quantized and the corresponding data bit width.

Article A10. The neural network quantization device of article A8, wherein the parameter determination sub-module includes:
- a first maximum value determination sub-module configured to, when the quantization parameter does not include the offset, obtain a maximum value of the piece of quantized data according to each piece of data to be quantized and the corresponding data bit width; and
- a first scale factor determination sub-module configured to obtain a first-kind scale factor of each piece of data to be quantized according to a maximum value of an absolute value of each piece of data to be quantized and the maximum value of the piece of quantized data.

Article A11. The neural network quantization device of article A8, wherein the parameter determination sub-module includes:
- a second point location determination sub-module configured to, when the quantization parameter includes the offset, obtain a second-kind point location of each piece of data to be quantized according to a maximum value and a minimum value of each piece of data to be quantized and the corresponding data bit width.

Article A12. The neural network quantization device of article A8, wherein the parameter determination sub-module includes:
- a second maximum value determination sub-module configured to, when the quantization parameter includes the offset, obtain a maximum value of the piece of quantized data according to each piece of data to be quantized and the corresponding data bit width; and
- a second scale factor determination sub-module configured to obtain a second-kind scale factor of each piece of data to be quantized according to a maximum value and a minimum value of the piece of data to be quantized, and the maximum value of the piece of quantized data.

Article A13. The neural network quantization device of article A8, wherein the parameter determination sub-module includes:
- an offset determination sub-module configured to obtain the offset of each piece of data to be quantized according to a maximum value and a minimum value of each piece of data to be quantized.

Article A14. The neural network quantization device of any one of articles A1 to A13, wherein the control module also includes:
- a first quantization error determination sub-module configured to determine a quantization error corresponding to each piece of data to be quantized according to each piece of data to be quantized and a piece of quantized data corresponding to each piece of data to be quantized;
- an adjustment bit width determination sub-module configured to adjust the data bit width of each piece of data to be quantized to obtain an adjusted bit width corresponding to each piece of data to be quantized according to the quantization error and an error threshold corresponding to each piece of data to be quantized; and
- an adjustment quantization parameter determination sub-module configured to update the data bit width corresponding to each piece of data to be quantized to a corresponding adjusted bit width, and compute a corresponding adjusted quantization parameter according to each piece of data to be quantized and the corresponding adjusted bit width, so that each piece of data to be quantized is quantized according to the corresponding adjusted quantization parameter.

Article A15. The neural network quantization device of article A14, wherein the adjustment bit width determination sub-module includes:
- a first adjustment bit width determination sub-module configured to, when the quantization error is greater than a first error threshold, increase the corresponding data bit width to obtain the corresponding adjusted bit width.

Article A16. The neural network quantization device of article A14 or A15, wherein the control module also includes:
- a first adjusted quantization error sub-module configured to compute an adjusted quantization error of each piece of data to be quantized according to the piece of data to be quantized and the corresponding adjusted bit width; and
- a first adjustment bit width loop determination module configured to continue to increase the corresponding adjusted bit width according to the adjusted quantization error and the first error threshold until the adjusted quantization error is less than or equal to the first error threshold.

Article A17. The neural network quantization device of article A14 or A15, wherein the first adjustment bit width determination sub-module includes:
- a second adjustment bit width determination sub-module configured to, when the quantization error is less than a second error threshold, decrease the corresponding data bit width to obtain the corresponding adjusted bit width, wherein the second error threshold is less than the first error threshold.

Article A18. The neural network quantization device of article A17, wherein the control module also includes:
- a second adjusted quantization error sub-module configured to compute the adjusted quantization error of the data to be quantized according to the adjusted bit width and the data to be quantized; and
- a second adjustment bit width loop determination sub-module configured to continue to decrease the adjusted bit width according to the adjusted quantization error and the second error threshold until the adjusted quantization error obtained according to the adjusted bit width and the data to be quantized is greater than or equal to the second error threshold.

Article A19. The neural network quantization device of any one of articles A1 to A18, wherein during a fine-tuning stage and/or training stage of the neural network operation, the device further includes:
- a first data variation range determination sub-module configured to obtain a variation range of the data to be quantized in a current iteration and historical iterations, wherein the historical iterations are iterations before the current iteration; and
- a target iteration interval determination sub-module configured to, according to the variation range of the data to be quantized, determine a target iteration interval corresponding to the data to be quantized to enable the layer to be quantized to update the quantization parameter of the data to be quantized according to the target iteration interval, wherein the target iteration interval includes at least one iteration.

Article A20. The neural network quantization device of article A19, wherein the control module also includes:
- a first target iteration interval application sub-module configured to, according to the data bit width of the data to be quantized in the current iteration, determine the data bit width of the data to be quantized in iterations within the target iteration interval to enable the neural network to determine the quantization parameter according to the data bit width of the data to be quantized in the iterations within the target iteration interval.

Article A21. The neural network quantization device of article A20, wherein the control module also includes:
- a second target iteration interval application sub-module configured to, according to the point location of the data to be quantized in the current iteration, determine the point location of the data to be quantized in the iterations within the target iteration interval, wherein the point location includes the first-kind point location and/or the second-kind point location.

Article A22. The neural network quantization device of article A19, wherein the first data variation range determination sub-module includes:
- a moving average computation sub-module configured to, according to the point location of the data to be quantized in the current iteration and the point location in a historical iteration corresponding to the current iteration determined according to a historical iteration interval, compute a moving average of the point locations of the data to be quantized in the respective iteration intervals, wherein the point location includes the first-kind point location and/or the second-kind point location; and
- a first data variation range determination sub-module configured to obtain a first data variation range according to a first moving average of the point location of the data to be quantized in the current iteration and a second moving average of the point location in an iteration corresponding to a previous iteration interval, wherein
the target iteration interval determination sub-module includes:
- a first target iteration interval determination sub-module configured to determine the target iteration interval corresponding to the data to be quantized according to the first data variation range to enable the neural network to update the quantization parameter of the data to be quantized according to the target iteration interval.

Article A23. The neural network quantization device of article A22, wherein the first data variation range determination sub-module includes:
- a first range determination sub-module configured to compute a difference between the first moving average and the second moving average, and determine an absolute value of the difference as the first data variation range.

Article A24. The neural network quantization device of article A23, wherein the control module also includes:
- a second data variation range determination sub-module configured to obtain a second data variation range according to the data to be quantized and the quantized data corresponding to the data to be quantized in the current iteration, wherein
the target iteration interval determination sub-module further includes:
- a second target iteration interval determination sub-module configured to determine the target iteration interval corresponding to the data to be quantized according to the first data variation range and the second data variation range of the data to be quantized to enable the neural network to update the quantization parameter of the data to be quantized according to the target iteration interval.

Article A25. The neural network quantization device of article A24, wherein the second data variation range determination module includes:
a second range determination sub-module configured to compute an error between the data to be quantized and the quantized data corresponding to the data to be quantized in the current iteration, and determine the square of the error as the second data variation range.

Article A26. The neural network quantization device of article A24, wherein the second target iteration interval determination sub-module includes:
an interval determination sub-module configured to determine the target iteration interval corresponding to the data to be quantized according to a maximum value of the first data variation range and the second data variation range.

Article A27. The neural network quantization device of any one of articles A19 to A26, wherein the first data variation range determination sub-module includes:
the second data variation range determination sub-module configured to, when the current iteration is outside of an update period, obtain the data variation range of the data to be quantized in the current iteration and the historical iterations, wherein the update period includes at least one iteration.

Article A28. The neural network quantization device of any one of articles A19 to A27, wherein the control module also includes:
a period interval determination sub-module configured to, when the current iteration is within a preset period, determine a period interval according to the current iteration, an iteration corresponding to the current iteration in a next period after the preset period, and an iteration interval corresponding to the current iteration;
a first period interval application sub-module configured to determine the data bit width of the data to be quantized in an iteration within the period interval according to the data bit width of the data to be quantized corresponding to the current iteration; or
a second period interval application sub-module configured to determine the point location of the data to be quantized in the iteration within the period interval according to the point location of the data to be quantized corresponding to the current iteration.

Article A29. A neural network quantization method applied to a neural network quantization device which includes a control module and a processing module, wherein the processing module includes a first operation sub-module which includes a main operation sub-module and a secondary operation sub-module, the neural network quantization method comprising:
determining, by the control module, a plurality pieces of data to be quantized from target data of the neural network, and obtaining a quantization result of the target data according to a piece of quantized data corresponding to each piece of data to be quantized, wherein the piece of quantized data corresponding to each piece of data to be quantized is obtained by quantizing the piece of data to be quantized by using a corresponding quantization parameter, wherein the quantization parameter includes a point location;
performing, by the first operation sub-module, an operation related to the quantization result to obtain an operation result, wherein
performing, by the first operation sub-module, an operation related to the quantization result to obtain the operation result includes:
sending, by the main operation sub-module, first data to the secondary operation sub-module, wherein the first data includes first-style data, which is in the quantization result, obtained by quantizing according to the point location;
performing, by the secondary operation sub-module, multiplication on the received first data to obtain an intermediate result; and
performing, by the main operation sub-module, an operation on data except for the first data in the intermediate result and the quantization result to obtain the operation result.

Article A30. The neural network quantization method of article A29, wherein the quantization parameter also includes an offset and/or a scale factor, the quantization result also includes second-style data, wherein the second-style data includes data of a first part represented by the point location, and data of a second part represented by the offset and/or the scale factor; and
the first data also includes a first part of the second-style data in the quantization result.

Article A31. The neural network quantization method of article A29, wherein the processing module also includes a data conversion sub-module, the method further comprising:
converting, by the data conversion sub-module, a format of data to be converted to obtain converted data, wherein format styles of the converted data include any one of a first style and a second style, the data to be converted includes data that is not subjected to quantization in the target data, and the first data also includes first-style converted data and/or a first part of second-style converted data, wherein
performing, by the main operation sub-module, an operation on data except for the first data in the intermediate result and the quantization result to obtain the operation result includes:
performing, by the main operation sub-module, an operation on the intermediate result, the data except for the first data in the intermediate result, and the data except for the first data in the converted data to obtain the operation result.

Article A32. The neural network quantization method of article A31, further comprising:
converting, by the data conversion sub-module, the format of the quantization result to be converted of the target data which is obtained according to the quantized data corresponding to the respective data to be quantized to obtain the quantization result.

Article A33. The neural network quantization method of any one of articles A29 to A32, wherein each piece of data to be quantized is a subset of the target data, the target data is any kind of data to be operated and to be quantized in a layer to be quantized of the neural network, and the data to be operated includes at least one of an input neuron, a weight, a bias, and a gradient.

Article A34. The neural network quantization method of article A33, wherein determining, by the control module, a plurality of pieces of data to be quantized from the target data of the neural network includes at least one of:
determining the target data in one or more layers to be quantized as one piece of data to be quantized;

determining the same kind of data to be operated in one or more layers to be quantized as one piece of data to be quantized;

determining the data in one or more channels in the target data of a corresponding layer to be quantized as one piece of data to be quantized;

determining one or more batches of data in the target data of the corresponding layer to be quantized as one piece of data to be quantized; and dividing the target data in the corresponding layer to be quantized into one or more pieces of data to be quantized according to a determined division size.

Article A35. The neural network quantization method of article A29, wherein the processing module also includes a second operation sub-module, the method further comprising:

performing, by the second operation sub-module, an operation processing except for the operation processing in the device performed by the first operation sub-module.

Article A36. The neural network quantization method of article A29 or A30, further comprising:

computing the corresponding quantization parameter according to each piece of data to be quantized and the corresponding data bit width.

Article A37. The neural network quantization method of article A36, wherein computing the corresponding quantization parameter according to each piece of data to be quantized and the corresponding data bit width includes:

when the quantization parameter does not include the offset, obtaining a first-kind point location of each piece of data to be quantized according to a maximum value of an absolute value of each piece of data to be quantized and the corresponding data bit width.

Article A38. The neural network quantization method of article A36, wherein computing the corresponding quantization parameter according to each piece of data to be quantized and the corresponding data bit width includes:

when the quantization parameter does not include the offset, obtaining a maximum value of the piece of quantized data according to each piece of data to be quantized and the corresponding data bit width; and obtaining a first-kind scale factor of each piece of data to be quantized according to a maximum value of an absolute value of each piece of data to be quantized and the maximum value of the piece of quantized data.

Article A39. The neural network quantization method of article A36, wherein computing the corresponding quantization parameter according to each piece of data to be quantized and the corresponding data bit width includes:

when the quantization parameter includes an offset, obtaining a second-kind point location of each piece of data to be quantized according to a maximum value and a minimum value of each piece of data to be quantized and the corresponding data bit width.

Article A40. The neural network quantization method of article A36, wherein computing the corresponding quantization parameter according to each piece of data to be quantized and the corresponding data bit width includes:

when the quantization parameter includes an offset, obtaining a maximum value of the piece of quantized data according to each piece of data to be quantized and the corresponding data bit width; and obtaining a second-kind scale factor of each piece of data to be quantized according to a maximum value and a minimum value of each piece of data to be quantized as well as the maximum value of the piece of quantized data.

Article A41. The neural network quantization method of article A36, wherein computing the corresponding quantization parameter according to each piece of data to be quantized and the corresponding data bit width includes:

obtaining the offset of each piece of data to be quantized according to a maximum value and a minimum value in each piece of data to be quantized.

Article A40. The neural network quantization method of any one of articles A29 to A41, further comprising:

determining a quantization error corresponding to each piece of data to be quantized according to each piece of data to be quantized and the piece of quantized data corresponding to each piece of data to be quantized;

adjusting the data bit width corresponding to each piece of data to be quantized to obtain an adjusted bit width corresponding to each piece of data to be quantized according to the quantization error and an error threshold corresponding to each piece of data to be quantized; and updating the data bit width corresponding to each piece of data to be quantized to the corresponding adjusted bit width, and computing a corresponding adjusted quantization parameter according to each piece of data to be quantized and the corresponding adjusted bit width to quantize each piece of data to be quantized according to the corresponding adjusted quantization parameter.

Article A43. The neural network quantization method of article A42, wherein adjusting the data bit width corresponding to each piece of data to be quantized to obtain the adjusted bit width corresponding to each piece of data to be quantized according to the quantization error and the error threshold corresponding to each piece of data to be quantized includes:

when the quantization error is greater than a first error threshold, increasing the corresponding data bit width to obtain the corresponding adjusted bit width.

Article A44. The neural network quantization method of article A42 or A43, further comprising:

computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold.

Article A45. The neural network quantization method of article A42 or A43, wherein adjusting the data bit width corresponding to each piece of data to be quantized to obtain the adjusted bit width corresponding to each piece of data to be quantized according to the quantization error and the error threshold corresponding to each piece of data to be quantized includes:

when the quantization error is less than a second error threshold, increasing the corresponding data bit width to obtain the corresponding adjusted bit width, wherein the second error threshold is less than the first error threshold.

Article A46. The neural network quantization method of article A45, further comprising:

computing an adjusted quantization error of each piece of data to be quantized according to the adjusted bit width and the piece of data to be quantized; and continuing to decrease the adjusted bit width according to the adjusted quantization error and the second error threshold until the adjusted quantization error obtained according to the adjusted bit width and the piece of data to be quantized is greater than or equal to the second error threshold.

Article A47. The neural network quantization method of any one of article A29 to A44, wherein during a fine-tuning stage and/or training stage of the neural network operation, the method further comprises:
obtaining a variation range of data to be quantized in a current iteration and historical iterations, wherein the historical iterations are iterations before the current iteration; and
according to the variation range of the data to be quantized, determining a target iteration interval corresponding to the data to be quantized to enable the layer to be quantized to update a quantization parameter of the data to be quantized according to the target iteration interval, wherein the target iteration interval includes at least one iteration.

Article A48. The neural network quantization method of article A47, further comprising:
according to a data bit width of the data to be quantized in the current iteration, determining a data bit width of the data to be quantized in iterations within the target iteration interval to enable the neural network to determine a quantization parameter according to the data bit width of the data to be quantized in the iterations within the target iteration interval.

Article A49. The neural network quantization method of article A48, further comprising:
according to a point location of the data to be quantized in the current iteration, determining a point location of the data to be quantized in the iterations within the target iteration interval, wherein the point location includes a first-kind point location and/or a second-kind point location.

Article A50. The neural network quantization method of article A47, wherein obtaining the data variation range of the data to be quantized in the current iteration and the historical iterations includes:
according to the point location of the data to be quantized in the current iteration and the point location in a historical iteration corresponding to the current iteration determined according to a historical iteration interval, computing a moving average of the point locations of the data to be quantized in the respective iteration intervals, wherein the point locations include the first-kind point location and/or the second-kind point location; and
obtaining a first data variation range according to a first moving average of the point location of the data to be quantized in the current iteration and a second moving average of the point location in an iteration corresponding to a previous iteration interval, wherein
determining the target iteration interval corresponding to the data to be quantized according to the variation range of the data to be quantized to enable the layer be quantized to update the quantization parameter of the data to be quantized according to the target iteration interval includes:
determining the target iteration interval corresponding to the data to be quantized according to the first data variation range to enable the neural network to update the quantization parameter of the data to be quantized according to the target iteration interval.

Article A51. The neural network quantization method of article A50, wherein obtaining the data variation range of the data to be quantized in the current iteration and the historical iterations includes:
computing a difference between the first moving average and the second moving average; and
determining an absolute value of the difference as the first data variation range.

Article A52. The neural network quantization method of article A51, further comprising:
obtaining a second data variation range according to the data to be quantized and the quantized data corresponding to the data to be quantized in the current iteration, wherein
determining the target iteration interval corresponding to the data to be quantized according to the variation range of the data to be quantized to enable the layer be quantized to update the quantization parameter of the data to be quantized according to the target iteration interval includes:
determining the target iteration interval corresponding to the data to be quantized according to the first data variation range and the second data variation range of the data to be quantized to enable the neural network to update the quantization parameter of the data to be quantized according to the target iteration interval.

Article A53. The neural network quantization method of article A52, wherein obtaining the second data variation range according to the data to be quantized and the quantized data corresponding to the data to be quantized in the current iteration includes:
computing an error between the data to be quantized and the quantized data corresponding to the data to be quantized in the current iteration; and
determining the square of the error as the second data variation range.

Article A54. The neural network quantization method of article A52, wherein determining the target iteration interval corresponding to the data to be quantized according to the first data variation range and the second data variation range of the data to be quantized includes:
determining the target iteration interval corresponding to the data to be quantized according to a maximum value of the first data variation range and the second data variation range.

Article A55. The neural network quantization method of any one of articles A47-A54, wherein obtaining the data variation range of the data to be quantized in the current iteration and the historical iterations includes:
when the current iteration is outside of an update period, obtaining the data variation range of the data to be quantized in the current iteration and the historical iterations, wherein the update period includes at least one iteration.

Article A56. The neural network quantization method of any one of articles A47 to A55, further comprising:
when the current iteration is within a preset period, determining a period interval according to the current iteration, an iteration corresponding to the current iteration in a next period after the preset period, and an iteration interval corresponding to the current iteration;
determining the data bit width of the data to be quantized in an iteration within the period interval according to the data bit width of the data to be quantized in the current iteration; or determining the point location of the data to be quantized in the iteration within the period interval according to the point location of the data to be quantized in the current iteration.

Article A57. An artificial intelligence chip comprising the neural network quantization device of any one of articles A1 to A28.

Article A58. An electronic equipment comprising the artificial intelligence chip of article A57.

Article A59. A board card comprising a storage component, an interface device, a control component, and the artificial intelligence chip of article A58, wherein the artificial intelligence chip is connected to the storage component, the control component, and the interface device, respectively;

the storage component is configured to store data;

the interface device is configured to implement data transfer between the artificial intelligence chip and an external equipment; and the control component is configured to monitor a state of the artificial intelligence chip.

Article A60. The board card of article A59, wherein the storage component includes: a plurality groups of storage units, wherein each group of storage units is connected to the artificial intelligence chip through a bus, and the storage units are DDR SDRAMs;

the chip includes a DDR controller configured to control data transfer and data storage of each storage unit; and the interface device is a standard PCIE interface.

Article A61. A non-volatile computer-readable storage medium, wherein a computer program instruction is stored in the non-volatile computer-readable storage medium, and when the computer program instruction is executed by a processor, the computer program instruction implements the neural network quantization method of any one of articles A29 to A56.

The embodiments of the present disclosure have been described in detail above. Specific examples have been used in the specification to explain the principles and implementations of the present disclosure. The descriptions of the above embodiments are only used to facilitate understanding of the methods and core ideas of the present disclosure. Persons of ordinary skill in the art may change or transform the implementation and application scope according to the ideas of the present application. The changes and transformations shall all fall within the protection scope of the present disclosure. In summary, the content of this specification should not be construed as a limitation on the present disclosure.

The invention claimed is:

1. A neural network quantization device comprising:

one or more processors; and memories for storing data;

wherein the one or more processors comprise a control module and a processing module; and the processing module includes a first operation sub-module which includes a main operation sub-module and a secondary operation sub-module;

wherein the control module is configured to determine a plurality of pieces of data to be quantized from target data of a neural network, and obtain a quantization result of the target data according to a piece of quantized data corresponding to each piece of data to be quantized, wherein the piece of quantized data corresponding to each piece of data to be quantized is obtained by quantizing the piece of data to be quantized using a corresponding quantization parameter, wherein the quantization parameter includes a point location;

wherein the first operation sub-module is configured to perform an operation related to the quantization result to obtain an operation result;

wherein the main operation sub-module is configured to send first data to the secondary operation sub-module, wherein the first data includes first-style data, which is in the quantization result and is obtained by quantizing according to the point location;

wherein the secondary operation sub-module is configured to perform multiplication on the received first data to obtain an intermediate result;

wherein the control module includes a parameter determination sub-module configured to compute the corresponding quantization parameter according to each piece of data to be quantized and a corresponding data bit width;

wherein the parameter determination sub-module includes:

a first point location determination sub-module configured to, when the quantization parameter does not include an offset, obtain a first-kind point location of each piece of data to be quantized according to a maximum value of an absolute value of each piece of data to be quantized and the corresponding data bit width;

a first maximum value determination sub-module configured to, when the quantization parameter does not include the offset, obtain a maximum value of the piece of quantized data according to each piece of data to be quantized and the corresponding data bit width; and a first scale factor determination sub-module configured to obtain a first-kind scale factor of each piece of data to be quantized according to a maximum value of an absolute value of each piece of data to be quantized and the maximum value of the piece of quantized data;

a second point location determination sub-module configured to, when the quantization parameter includes the offset, obtain a second-kind point location of each piece of data to be quantized according to a maximum value and a minimum value of each piece of data to be quantized and the corresponding data bit width;

a second maximum value determination sub-module configured to, when the quantization parameter includes the offset, obtain a maximum value of the piece of quantized data according to each piece of data to be quantized and the corresponding data bit width;

a second scale factor determination sub-module configured to obtain a second-kind scale factor of each piece of data to be quantized according to a maximum value and a minimum value of the piece of data to be quantized, and the maximum value of the piece of quantized data;

an offset determination sub-module configured to obtain the offset of each piece of data to be quantized according to a maximum value and a minimum value of each piece of data to be quantized;

wherein the main operation sub-module is also configured to perform an operation on data except for the first data in the intermediate result and the quantization result to obtain the operation result; and data to be quantized is quantized according to the corresponding quantization parameter, to reduce a storage space of the data while ensuring a precision, and ensuring an accuracy and a reliability of the operation result and increase an operation efficiency.

2. The neural network quantization device of claim 1, wherein the quantization parameter includes an offset and/or a scale factor, and the quantization result further includes second-style data, wherein the second-style data includes data of a first part represented by the point location, and data of a second part represented by the offset and/or the scale factor; and the first data also includes a first part of the second-style data in the quantization result.

3. The neural network quantization device of claim 1, wherein the processing module also includes:
   a data conversion sub-module configured to convert a format of data to be converted to obtain converted data, wherein format styles of the converted data include any one of a first style and a second style, wherein the data to be converted includes data that is not subjected to quantization in the target data, and the first data further includes first-style converted data and/or a first part of second-style converted data;
   wherein the main operation sub-module is configured to perform an operation on the intermediate result, the data except for the first data in the intermediate result, and the data except for the first data in the converted data to obtain an operation result, and
   the data conversion sub-module is also configured to convert a format of the quantization result to be obtained from the to-be converted target data according to the piece of quantized data corresponding to the respective data to be quantized, in order to obtain the quantization result.

4. The neural network quantization device of claim 1, wherein each piece of data to be quantized is a subset of the target data; wherein the target data is a kind of data to be operated and to be quantized in a layer to be quantized of the neural network, and the data to be operated includes at least one of an input neuron, a weight, a bias, and a gradient; and wherein the control module determines a plurality pieces of data to be quantized by adopting at least one of:
   determining the target data in one or more layers to be quantized as one piece of data to be quantized;
   determining the same kind of data to be operated in one or more layers to be quantized as one piece of data to be quantized;
   determining the data in one or more channels in the target data of a corresponding layer to be quantized as one piece of data to be quantized;
   determining one or more batches of data in the target data of the corresponding layer to be quantized as one piece of data to be quantized; and
   dividing the target data in the corresponding layer to be quantized into one or more pieces of data to be quantized according to a determined division size.

5. The neural network quantization device of claim 1, wherein the control module also includes:
   a first quantization error determination sub-module configured to determine a quantization error corresponding to each piece of data to be quantized according to each piece of data to be quantized and a piece of quantized data corresponding to each piece of data to be quantized;
   an adjustment bit width determination sub-module configured to adjust the data bit width of each piece of data to be quantized to obtain an adjusted bit width corresponding to each piece of data to be quantized according to the quantization error and an error threshold corresponding to each piece of data to be quantized; and
   an adjustment quantization parameter determination sub-module configured to update the data bit width corresponding to each piece of data to be quantized to a corresponding adjusted bit width, and compute a corresponding adjusted quantization parameter according to each piece of data to be quantized and the corresponding adjusted bit width, so that each piece of data to be quantized is quantized according to the corresponding adjusted quantization parameter.

6. The neural network quantization device of claim 5, wherein the control module includes:
   a first adjustment bit width determination sub-module configured to, when the quantization error is greater than a first error threshold, increase the corresponding data bit width to obtain the corresponding adjusted bit width;
   a first adjusted quantization error sub-module configured to compute an adjusted quantization error of each piece of data to be quantized according to the piece of data to be quantized and the corresponding adjusted bit width;
   a first adjustment bit width loop determination module configured to continue to increase the corresponding adjusted bit width according to the adjusted quantization error and the first error threshold until the adjusted quantization error is less than or equal to the first error threshold;
   a second adjusted quantization error sub-module configured to compute the adjusted quantization error of the data to be quantized according to the adjusted bit width and the data to be quantized;
   a second adjustment bit width loop determination sub-module configured to continue to decrease the adjusted bit width according to the adjusted quantization error and the second error threshold until the adjusted quantization error obtained according to the adjusted bit width and the data to be quantized is greater than or equal to the second error threshold; and
   a second adjustment bit width determination sub-module configured to, when the quantization error is less than a second error threshold, decrease the corresponding data bit width to obtain the corresponding adjusted bit width, wherein the second error threshold is less than the first error threshold.

7. The neural network quantization device of claim 1, wherein during a fine-tuning stage and/or training stage of the neural network operation, the neural network quantization device further includes:
   a first data variation range determination sub-module configured to obtain a variation range of the data to be quantized in a current iteration and historical iterations, wherein the historical iterations are iterations before the current iteration; and
   a target iteration interval determination sub-module configured to, according to the variation range of the data to be quantized, determine a target iteration interval corresponding to the data to be quantized to enable a layer to be quantized to update the quantization parameter of the data to be quantized according to the target iteration interval, wherein the target iteration interval includes at least one iteration.

8. An artificial intelligence chip comprising the neural network quantization device of claim 1.

9. A neural network quantization method applied to a neural network quantization device which includes a control module and a processing module, wherein the processing module includes a first operation sub-module which includes a main operation sub-module and a secondary operation sub-module, the neural network quantization method comprising:

determining, by the control module, a plurality pieces of data to be quantized from target data of a neural network, and obtaining a quantization result of the target data according to a piece of quantized data corresponding to each piece of data to be quantized, wherein the piece of quantized data corresponding to each piece of data to be quantized is obtained by quantizing the piece of data to be quantized by using a corresponding quantization parameter, wherein the quantization parameter includes a point location; and
    performing, by the first operation sub-module, an operation related to the quantization result to obtain an operation result, wherein performing, by the first operation sub-module, an operation related to the quantization result to obtain the operation result includes:
        sending, by the main operation sub-module, first data to the secondary operation sub-module, wherein the first data includes first-style data, which is in the quantization result and is obtained by quantizing according to the point location;
        performing, by the secondary operation sub-module, multiplication on the received first data to obtain an intermediate result;
        computing the corresponding quantization parameter according to each piece of data to be quantized and the corresponding data bit width;
        wherein computing the corresponding quantization parameter according to each piece of data to be quantized and the corresponding data bit width includes:
        when the quantization parameter does not include an offset, obtaining a first-kind point location of each piece of data to be quantized according to a maximum value of an absolute value of each piece of data to be quantized and the corresponding data bit width;
        when the quantization parameter does not include the offset, obtaining a maximum value of the piece of quantized data according to each piece of data to be quantized and the corresponding data bit width, and obtaining a first-kind scale factor of each piece of data to be quantized according to a maximum value of an absolute value of each piece of data to be quantized and the maximum value of the piece of quantized data;
        when the quantization parameter includes an offset, obtaining a second-kind point location of each piece of data to be quantized according to a maximum value and a minimum value of each piece of data to be quantized and the corresponding data bit width;
        when the quantization parameter includes an offset, obtaining a maximum value of the piece of quantized data according to each piece of data to be quantized and the corresponding data bit width, and obtaining a second-kind scale factor of each piece of data to be quantized according to a maximum value and a minimum value of each piece of data to be quantized as well as the maximum value of the piece of quantized data; or
        obtaining the offset of each piece of data to be quantized according to a maximum value and a minimum value in each piece of data to be quantized;
        performing, by the main operation sub-module, an operation on data except for the first data in the intermediate result and the quantization result to obtain the operation result; and
        data to be quantized is quantized according to the corresponding quantization parameter, to reduce a storage space of the data while ensuring a precision, and ensuring an accuracy and a reliability of the operation result and increase an operation efficiency.

10. The neural network quantization method of claim 9, wherein the quantization parameter also includes an offset and/or a scale factor, the quantization result also includes second-style data, wherein the second-style data includes data of a first part represented by the point location, and data of a second part represented by the offset and/or the scale factor; and the first data also includes a first part of the second-style data in the quantization result.

11. The neural network quantization method of claim 9, wherein the processing module also includes a data conversion sub-module, the method further comprising:

converting, by the data conversion sub-module, a format of data to be converted to obtain converted data, wherein format styles of the converted data include any one of a first style and a second style, the data to be converted includes data that is not subjected to quantization in the target data, and the first data also includes first-style converted data and/or a first part of second-style converted data, wherein performing, by the main operation sub-module, an operation on data except for the first data in the intermediate result and the quantization result to obtain the operation result includes:
        performing, by the main operation sub-module, an operation on the intermediate result, the data except for the first data in the intermediate result, and the data except for the first data in the converted data to obtain the operation result; and
    converting, by the data conversion sub-module, the format of the quantization result to be converted of the target data which is obtained according to the quantized data corresponding to the respective data to be quantized to obtain the quantization result.

12. The neural network quantization method of claim 9, wherein each piece of data to be quantized is a subset of the target data, the target data is any kind of data to be operated and to be quantized in a layer to be quantized of the neural network, and the data to be operated includes at least one of an input neuron, a weight, a bias, and a gradient; and
    wherein determining, by the control module, a plurality of pieces of data to be quantized from the target data of the neural network includes at least one of:
        determining the target data in one or more layers to be quantized as one piece of data to be quantized;
        determining the same kind of data to be operated in one or more layers to be quantized as one piece of data to be quantized;
        determining the data in one or more channels in the target data of a corresponding layer to be quantized as one piece of data to be quantized;
        determining one or more batches of data in the target data of the corresponding layer to be quantized as one piece of data to be quantized; and
        dividing the target data in the corresponding layer to be quantized into one or more pieces of data to be quantized according to a determined division size.

13. The neural network quantization method of 9, further comprising:

determining a quantization error corresponding to each piece of data to be quantized according to each piece of data to be quantized and the piece of quantized data corresponding to each piece of data to be quantized;

adjusting the data bit width corresponding to each piece of data to be quantized to obtain an adjusted bit width corresponding to each piece of data to be quantized according to the quantization error and an error threshold corresponding to each piece of data to be quantized; and updating the data bit width corresponding to each piece of data to be quantized to the corresponding adjusted bit width, and computing a corresponding adjusted quantization parameter according to each piece of data to be quantized and the corresponding adjusted bit width to quantize each piece of data to be quantized according to the corresponding adjusted quantization parameter.

14. The neural network quantization method of claim 13, wherein adjusting the data bit width corresponding to each piece of data to be quantized to obtain the adjusted bit width corresponding to each piece of data to be quantized according to the quantization error and the error threshold corresponding to each piece of data to be quantized includes:

when the quantization error is greater than a first error threshold, increasing the corresponding data bit width to obtain the corresponding adjusted bit width;

wherein the neural network quantization method further comprising:

computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold;

computing an adjusted quantization error of each piece of data to be quantized according to the adjusted bit width and the piece of data to be quantized; and continuing to decrease the adjusted bit width according to the adjusted quantization error and the second error threshold until the adjusted quantization error obtained according to the adjusted bit width and the piece of data to be quantized is greater than or equal to the second error threshold;

wherein adjusting the data bit width corresponding to each piece of data to be quantized to obtain the adjusted bit width corresponding to each piece of data to be quantized according to the quantization error and the error threshold corresponding to each piece of data to be quantized includes:

when the quantization error is less than a second error threshold, increasing the corresponding data bit width to obtain the corresponding adjusted bit width, wherein the second error threshold is less than the first error threshold.

15. The neural network quantization method of claim 9, wherein during a fine-tuning stage and/or training stage of the neural network operation, the method further comprises:

obtaining a variation range of data to be quantized in a current iteration and historical iterations, wherein the historical iterations are iterations before the current iteration; and according to the variation range of the data to be quantized, determining a target iteration interval corresponding to the data to be quantized to enable a layer to be quantized to update a quantization parameter of the data to be quantized according to the target iteration interval, wherein the target iteration interval includes at least one iteration.

16. A non-transitory computer-readable storage medium, wherein a computer program instruction is stored in the non-volatile computer-readable storage medium, and when the computer program instruction is executed by a processor, the computer program instruction implements the neural network quantization method of claim 9.

* * * * *